(12) United States Patent
O'Donoghue et al.

(10) Patent No.: US 9,253,282 B2
(45) Date of Patent: Feb. 2, 2016

(54) METHOD AND APPARATUS FOR GENERATING, USING, OR UPDATING AN ENRICHED USER PROFILE

(75) Inventors: Hugh O'Donoghue, Dun Laoighre (IE); Peter Charles Whale, Ely (GB); Colm Healy, Dublin (IE); Andrew Pegum, Co Dublin (IE); Sean Corrigan, Dublin (IE); Scott Beith, Carlsbad, CA (US); Jason Hough, San Diego, CA (US); Anthony M. Sheehan, Hove Sussex (GB)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/602,248

(22) Filed: Sep. 3, 2012

(65) Prior Publication Data

US 2013/0238686 A1   Sep. 12, 2013

Related U.S. Application Data

(60) Provisional application No. 61/599,725, filed on Feb. 16, 2012, provisional application No. 61/548,615, filed on Oct. 18, 2011.

(51) Int. Cl.
*H04L 29/08* (2006.01)
*G06Q 30/02* (2012.01)

(52) U.S. Cl.
CPC .............. *H04L 67/306* (2013.01); *G06Q 30/02* (2013.01); *H04L 67/22* (2013.01)

(58) Field of Classification Search
None
See application file for complete search history.

(56) References Cited

U.S. PATENT DOCUMENTS 5,754,938 A    5/1998   Herz et al.
6,446,076 B1   9/2002   Burkey et al.
(Continued)

FOREIGN PATENT DOCUMENTS

GB    2430281 A       3/2007
JP    2005309751 A    11/2005
(Continued)

OTHER PUBLICATIONS

Marcialis, I. et al. "Searchy: An Agent to Personalize Search Results." Third International Conference on Internet and Web Applications and Services, 2008. ICIW '08 [Online] 2008, pp. 512-517. (See Sections IV and V).
(Continued)

*Primary Examiner* — Nicholas Taylor
*Assistant Examiner* — Clayton R Williams
(74) *Attorney, Agent, or Firm* — Fariba Yadegar-Bandari; Satheesh Karra

(57) ABSTRACT

A method, an apparatus, and a computer program product for communication are provided in which a communications device is operable to provide an improved user experience or to improve the performance and/or operation of the device through use of an enriched user profile. In one aspect, the communications device may obtain an attribute including a user specific informational element from a component operable on the communications device. The communications device may generate a profile synopsis from the attribute by abstracting at least a portion of the user specific informational element from the attribute, and transmit the profile synopsis. The communications device may receive an enhanced informational element derived from an aggregation of profile synopses from a plurality of devices and may generate an enriched user profile by augmenting the attribute with at least a portion of the received enhanced informational element.

34 Claims, 21 Drawing Sheets

(56) References Cited

U.S. PATENT DOCUMENTS

| | | | |
|---|---|---|---|
| 6,483,523 | B1 | 11/2002 | Feng |
| 6,519,571 | B1 | 2/2003 | Guheen et al. |
| 6,603,489 | B1 | 8/2003 | Edlund et al. |
| 6,629,097 | B1 | 9/2003 | Keith |
| 6,675,017 | B1 * | 1/2004 | Zellner et al. ............. 455/456.1 |
| 6,807,574 | B1 | 10/2004 | Partovi et al. |
| 6,993,590 | B1 | 1/2006 | Gauthier et al. |
| 7,668,537 | B2 | 2/2010 | De Vries |
| 7,769,416 | B2 | 8/2010 | Wei et al. |
| 7,844,717 | B2 | 11/2010 | Herz et al. |
| 7,958,457 | B1 | 6/2011 | Brandenberg et al. |
| 8,407,500 | B2 | 3/2013 | Lee |
| 8,510,577 | B2 | 8/2013 | Scott et al. |
| 8,670,222 | B2 | 3/2014 | Rothkopf |
| 8,694,006 | B2 | 4/2014 | Kobayashi |
| 2003/0204708 | A1 | 10/2003 | Hulme et al. |
| 2004/0107283 | A1 | 6/2004 | Paddon |
| 2005/0138574 | A1 | 6/2005 | Lin |
| 2005/0222989 | A1 | 10/2005 | Haveliwala et al. |
| 2006/0053392 | A1 | 3/2006 | Salmimaa et al. |
| 2007/0010942 | A1 | 1/2007 | Bill |
| 2007/0011171 | A1 | 1/2007 | Nurminen et al. |
| 2007/0061243 | A1 | 3/2007 | Ramer et al. |
| 2007/0261114 | A1 | 11/2007 | Pomerantsev |
| 2008/0005695 | A1 | 1/2008 | Ozzie et al. |
| 2008/0270579 | A1 | 10/2008 | Herz et al. |
| 2008/0301166 | A1 | 12/2008 | Sugiyama et al. |
| 2009/0006551 | A1 | 1/2009 | Guday et al. |
| 2009/0011740 | A1 | 1/2009 | Aggarwal et al. |
| 2009/0048977 | A1 | 2/2009 | Aggarwal et al. |
| 2009/0097361 | A1 | 4/2009 | Nakamura et al. |
| 2009/0113296 | A1 | 4/2009 | Lacy et al. |
| 2009/0113346 | A1 | 4/2009 | Wickramasuriya et al. |
| 2009/0131152 | A1 | 5/2009 | Busse |
| 2009/0163183 | A1 | 6/2009 | ODonoghue et al. |
| 2009/0164572 | A1 | 6/2009 | Charlton et al. |
| 2009/0234711 | A1 | 9/2009 | Ramer et al. |
| 2010/0050118 | A1 | 2/2010 | Chowdhury et al. |
| 2010/0066642 | A1 | 3/2010 | Fuller et al. |
| 2010/0125809 | A1 | 5/2010 | Stergiou et al. |
| 2010/0159909 | A1 | 6/2010 | Stifelman |
| 2010/0174928 | A1 | 7/2010 | Borghetti et al. |
| 2010/0180001 | A1 | 7/2010 | Hardt |
| 2010/0203876 | A1 | 8/2010 | Krishnaswamy |
| 2010/0216509 | A1 | 8/2010 | Riemer et al. |
| 2010/0222080 | A1 | 9/2010 | Carreras et al. |
| 2010/0228715 | A1 | 9/2010 | Lawrence |
| 2010/0228795 | A1 | 9/2010 | Hahn et al. |
| 2010/0229082 | A1 | 9/2010 | Karmarkar et al. |
| 2010/0274815 | A1 | 10/2010 | Vanasco |
| 2010/0285858 | A1 * | 11/2010 | Clowes et al. ............. 463/9 |
| 2010/0332431 | A1 | 12/2010 | Ribiere et al. |
| 2011/0071780 | A1 | 3/2011 | Tarkoma |
| 2011/0083167 | A1 | 4/2011 | Carpenter et al. |
| 2011/0107206 | A1 * | 5/2011 | Walsh et al. ............. 715/256 |
| 2011/0125783 | A1 | 5/2011 | Whale et al. |
| 2011/0137927 | A1 | 6/2011 | Partridge et al. |
| 2011/0161076 | A1 | 6/2011 | Davis et al. |
| 2011/0191364 | A1 | 8/2011 | Lebeau et al. |
| 2011/0219328 | A1 | 9/2011 | Ilvessalmi et al. |
| 2011/0251788 | A1 | 10/2011 | Yarvis et al. |
| 2011/0251990 | A1 | 10/2011 | Yarvis et al. |
| 2011/0270685 | A1 * | 11/2011 | Marks et al. ............. 705/14.66 |
| 2011/0320307 | A1 * | 12/2011 | Mehta et al. ............. 705/26.7 |
| 2011/0320536 | A1 * | 12/2011 | Lobb et al. ............. 709/205 |
| 2012/0047143 | A1 * | 2/2012 | Petersen et al. ............. 707/738 |
| 2012/0047152 | A1 * | 2/2012 | Purdy ............. 707/754 |
| 2013/0238540 | A1 | 9/2013 | O'Donoghue et al. |
| 2013/0246595 | A1 | 9/2013 | O'Donoghue et al. |

FOREIGN PATENT DOCUMENTS

| | | |
|---|---|---|
| JP | 2010527066 A | 8/2010 |
| JP | 2011081431 A | 4/2011 |
| JP | 2011096173 A | 5/2011 |
| WO | 2008034072 A2 | 3/2008 |
| WO | 2009009504 A1 | 1/2009 |
| WO | 2009009505 | 1/2009 |
| WO | 2010110216 A1 | 9/2010 |
| WO | 2011075119 A1 | 6/2011 |

OTHER PUBLICATIONS

Song, S. et al. (2010). "Intelligent Smart Cloud Computing for Smart Service." Grid and Distributed Computing, Control and Automation Communications in Computer and Information Science (GDC/CA 2010, CCIS) vol. 121, pp. 64-73. Doi: 10.1007/978-3-642-17625-8_7.

Tee, S.H. et al. (2008). "An initial framework for predictive end-user application trigger." IEEE International Symposium on Information Technology, (ITSIM 2008), pp. 1-4. Doi: 10.1109/ITSIM.2008.4631715.

International Search Report and Written Opinion—PCT/EP2012/070597—ISA/EPO—Mar. 19, 2013.

Persson, H et al., "Context-based Service Adaptation Platform: Improving the User Experience towards Mobile Location Services", Information Networking, 2008. ICOIN 2008. International Conference on, IEEE, Piscataway, NJ, USA, Jan. 23, 2008, pp. 1-5, XP031238832, ISBN: 978-89-960761-1-7.

Qualcomm: "Make It Easy for Me—3 Ways Operators Can Use Personalization to Give Customers What They Want on the Mobile Internet", Jan. 1, 2009, pp. 1-10, XP55049857.

Myung J. I., "Tutotial on Maximum Likelihood Estimation", 47 J. Math. Psych., 90-100 (2003).

* cited by examiner

| | M | T | W | R | F | SAT | SUN |
|---|---|---|---|---|---|---|---|
| Morning | 1 | 1 | 0 | 0 | 0 | 1 | 1 |
| App(1) Usage | 1 | 1 | 0 | 0 | 0 | 2 | 2 |
| Location(1) | 0 | 0 | 1 | 0 | 0 | 1 | 1 |
| Location(2) | 0 | 0 | 0 | 0 | 1 | 1 | 1 |
| App(2) Usage | 0 | 0 | 0 | 0 | 1 | 3 | 1 |
| Afternoon | 1 | 1 | 1 | 1 | 0 | 1 | 1 |
| App(1) Usage | 5 | 5 | 7 | 5 | 0 | 4 | 5 |
| Location(1) | 0 | 0 | 1 | 0 | 0 | 1 | 0 |

METHOD AND APPARATUS FOR GENERATING, USING, OR UPDATING AN ENRICHED USER PROFILE

CLAIM OF PRIORITY UNDER 35 U.S.C. §119

This application claims the benefit of U.S. Provisional Application Ser. No. 61/548,615, entitled "Method and Apparatus for Use of an Enriched User Profile" filed on Oct. 18, 2011, and U.S. Provisional Application Ser. No. 61/599,725, entitled "Method and Apparatus for Generation, Use, and/or Update of an Enriched User Profile" filed on Feb. 16, 2012, which are expressly incorporated by reference herein in their entirety.

REFERENCE TO CO-PENDING APPLICATIONS FOR PATENT

The present Application for Patent is related to the following co-pending U.S. Patent Applications:

U.S. patent application Ser. No. 13/602,250, entitled "METHOD AND APPARATUS FOR IMPROVING A USER EXPERIENCE OR DEVICE PERFORMANCE USING AN ENRICHED USER PROFILE", filed concurrently herewith, assigned to the assignee hereof, and expressly incorporated by reference herein; and U.S. patent application Ser. No. 13/602,252, entitled "METHOD AND APPARATUS FOR USING AN ORGANIZATIONAL STRUCTURE FOR GENERATING, USING, OR UPDATING AN ENRICHED USER PROFILE", filed concurrently herewith, assigned to the assignee hereof, and expressly incorporated by reference herein.

BACKGROUND

The present application relates generally to device communications, and more specifically to methods and systems for providing an enhanced user experience and/or device optimization through supplementing, augmenting, and/or adding content to a user profile associated with a communications device (e.g., terminal, client, etc.).

Communication systems are widely deployed to provide various types of content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, time division synchronous code division multiple access (TD-SCDMA) systems and orthogonal frequency division multiple access (OFDMA) systems. Further these systems may be wireline based using coaxial cable, fiber optic cable, twisted pair, digital subscriber line (DSL), etc.

Generally, a multiple-access communication system can support communication for multiple wireless communications devices. Each device communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. This communication link may be established via a single-in-single-out, multiple-in-signal-out or a multiple-in-multiple-out (MIMO) system.

Further, a communications device may be operable to discovery information through interactions between a user and the device and/or via a server. Generally, server based discovery provides a user with large data sets of offers, access to collaborative filtering of information to gain "wisdom of the crowd," and delivery of recommendations across different channels (e.g., mobile device, internet, storefronts, etc.). Further, client based discovery allows for capturing data associated with a user interaction with an application, content, a handset function, real-world environment, and a user context and modality of use. These two discovery models both have deficiencies in areas such as, user privacy, efficient bandwidth usage, update latency, etc.

Therefore, a system and method that blends together both client and server data sources, optimizes processing and use of bandwidth between the client and server, provides real-time responsiveness on a client device to a personalized range of applications, services, etc., on a client device, and provides privacy protection for user specific information is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method for providing an improved user experience through use of an enriched user profile is provided. The method can include obtaining an attribute including a user specific informational element from a component operable on a communications device. Further, the method can include generating a profile synopsis from the attribute by abstracting at least a portion of the user specific informational element from the attribute. Further, the method can include transmitting the profile synopsis. Further, the method can include receiving an enhanced informational element. The enhanced informational element can be derived from aggregation of profile synopses from a plurality of devices. Moreover, the method may include generating an enriched user profile by augmenting the attribute with at least a portion of the received enhanced informational element.

Another aspect relates to a communications apparatus enabled to provide an improved user experience through use of an enriched user profile. The communications apparatus can include means for obtaining an attribute including a user specific informational element from a component operable on a communications device. Further, the communications apparatus can include means for generating a profile synopsis from the attribute by abstracting at least a portion of the user specific informational element from the attribute. Further, the communications apparatus can include means for transmitting the profile synopsis. Further, the communications apparatus can include means for receiving an enhanced informational element. The enhanced informational element can be derived from aggregation of profile synopses from a plurality of devices. Moreover, the communications apparatus can include means for generating an enriched user profile by augmenting the attribute with at least a portion of the received enhanced informational element.

Another aspect relates to a communications apparatus. The apparatus can include a processing system configured to obtain an attribute including a user specific informational element from a component operable on a communications device. Further, the processing system may be configured to generate a profile synopsis from the attribute by abstracting at least a portion of the user specific informational element from the attribute. Further, the processing system may be configured to transmit the profile synopsis. Further, the processing system may be configured to receive an enhanced informational element. The enhanced informational element can be derived from aggregation of profile synopses from a plurality of devices. Moreover, the processing system may further be configured to generate an enriched user profile by augmenting the attribute with at least a portion of the received enhanced informational element.

Still another aspect relates to a computer program product, which can have a computer-readable medium including at least one instruction for causing a computer to obtain an attribute including a user specific informational element from a component operable on a communications device. Further, the computer-readable medium can include at least one instruction for causing the computer to generate a profile synopsis from the attribute by abstracting at least a portion of the user specific informational element from the attribute. Further, the computer-readable medium can include at least one instruction for causing the computer to transmit the profile synopsis. Further, the computer-readable medium can include at least one instruction for causing the computer to receive an enhanced informational element. The enhanced informational element can be derived from aggregation of profile synopses from a plurality of devices. Moreover, the computer-readable medium can include at least one instruction for causing the computer to generate an enriched user profile by augmenting the attribute with at least a portion of the received enhanced informational element.

According to related aspects, a method for providing an improved user experience through use of an enriched user profile is provided. The method can include generating a profile server query associated with an attribute by modifying at least a portion of a user specific informational element associated with the attribute to disassociate the attribute from a user. Further, the method can include transmitting the profile server query. Further, the method can include receiving an enhanced informational element associated with the profile server query including metadata received from a metadata repository. Moreover, the method may include generating an enriched user profile by augmenting the attribute with at least a portion of the enhanced informational element.

Another aspect relates to a communications apparatus enabled to provide an improved user experience through use of an enriched user profile. The communications apparatus can include means for generating a profile server query associated with an attribute by modifying at least a portion of a user specific informational element associated with the attribute to disassociate the attribute from a user. Further, the communications apparatus can include means for transmitting the profile server query. Further, the communications apparatus can include means for receiving an enhanced informational element associated with the profile server query including metadata received from a metadata repository. Moreover, the communications apparatus can include means for generating an enriched user profile by augmenting the attribute with at least a portion of the enhanced informational element.

Another aspect relates to a communications apparatus. The apparatus can include a processing system configured to generate a profile server query associated with an attribute by modifying at least a portion of a user specific informational element associated with the attribute to disassociate the attribute from a user. Further, the processing system may be configured to transmit the profile server query. Further, the processing system may be configured to receive an enhanced informational element associated with the profile server query including metadata received from a metadata repository. Moreover, the processing system may further be configured to generate an enriched user profile by augmenting the attribute with at least a portion of the enhanced informational element.

Still another aspect relates to a computer program product, which can have a computer-readable medium including at least one instruction for causing a computer to generate a profile server query associated with an attribute by modifying at least a portion of a user specific informational element associated with the attribute to disassociate the attribute from a user. Further, the computer-readable medium can include at least one instruction for causing the computer to transmit the profile server query. Further, the computer-readable medium can include at least one instruction for causing the computer to receiving an enhanced informational element associated with the profile server query including metadata received from a metadata repository. Moreover, the computer-readable medium can include at least one instruction for causing the computer to generate an enriched user profile by augmenting the attribute with at least a portion of the enhanced informational element.

According to related aspects, a method for provided an improved user experience through use of an enriched user profile is provided. The method can include generating a proxy user identifier (ID) to identify a communications device. Further, the method can include transmitting the proxy user ID and an attribute associated with a user. Moreover, the method may include providing the proxy user ID to an application operable on the communications device. In one aspect, the application receives at least a portion of the attribute by transmitting the proxy user ID to allow an additional server to access the transmitted attribute, and receiving the personalized content from the additional server.

Another aspect relates to a communications apparatus enabled to provide an improved user experience through use of an enriched user profile. The communications apparatus can include means for generating a proxy user ID to identify a communications device. Further, the communications apparatus can include means for transmitting the proxy user ID and an attribute associated with a user. Moreover, the communications apparatus can include means for providing the proxy user ID to an application operable on the communications device. In one aspect, the application receives at least a portion of the attribute using means for transmitting the proxy user ID to allow an additional server to access the transmitted attribute, and means for receiving the personalized content from the additional server.

Another aspect relates to a communications apparatus. The apparatus can include a processing system configured to generate a proxy user ID to identify a communications device. Further, the processing system may be configured to transmit the proxy user ID and an attribute associated with a user. Moreover, the processing system may further be configured to provide the proxy user ID to an application operable on the communications device. In one aspect, the application receives at least a portion of the attribute by transmitting the proxy user ID to allow an additional server to access the transmitted attribute, and receiving the personalized content from the additional server.

Still another aspect relates to a computer program product, which can have a computer-readable medium including at least one instruction for causing the computer to generate a proxy user ID to identify a communications device. Further, the computer-readable medium can include at least one instruction for causing the computer to transmit the proxy user ID and an attribute associated with a user. Moreover, the computer-readable medium can include at least one instruction for causing the computer to provide the proxy user ID to an application operable on the communications device. In one aspect, the application receives at least a portion of the attribute using at least one instruction for causing the computer to transmit the proxy user ID to allow an additional server to access the transmitted attribute, and at least one instruction for causing the computer to receive the personalized content from the additional server.

According to related aspects, a method for provided an improved user experience through use of an enriched user profile is provided. The method can include receiving a plurality of profile synopses from a plurality of communications devices. In one aspect, each profile synopsis includes an informational element, and at least one informational element has been modified to remove at least a portion of user specific information from a user specific informational element available on a corresponding communications device. Moreover, the method may include aggregating the informational elements from the plurality of profile synopses to generate an enhanced informational element.

Another aspect relates to a communications apparatus enabled to provide an improved user experience through use of an enriched user profile. The communications apparatus can include means for receiving a plurality of profile synopses from a plurality of communications devices. In one aspect, each profile synopsis includes an informational element, and at least one informational element has been modified to remove at least a portion of user specific information from a user specific informational element available on a corresponding communications device. Moreover, the communications apparatus can include means for aggregating the informational elements from the plurality of profile synopses to generate an enhanced informational element.

Another aspect relates to a communications apparatus. The apparatus can include a processing system configured to receive a plurality of profile synopses from a plurality of communications devices. In one aspect, each profile synopsis includes an informational element, and at least one informational element has been modified to remove at least a portion of user specific information from a user specific informational element available on a corresponding communications device. Moreover, the processing system may further be configured to aggregating the informational elements from the plurality of profile synopses to generate an enhanced informational element.

Still another aspect relates to a computer program product, which can have a computer-readable medium including at least one instruction for causing the computer to receive a plurality of profile synopses from a plurality of communications devices. In one aspect, each profile synopsis includes an informational element, and at least one informational element has been modified to remove at least a portion of user specific information from a user specific informational element available on a corresponding communications device. Moreover, the computer-readable medium can include at least one instruction for causing the computer to aggregate the informational elements from the plurality of profile synopses to generate an enhanced informational element.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DESCRIPTION

Figure 1:
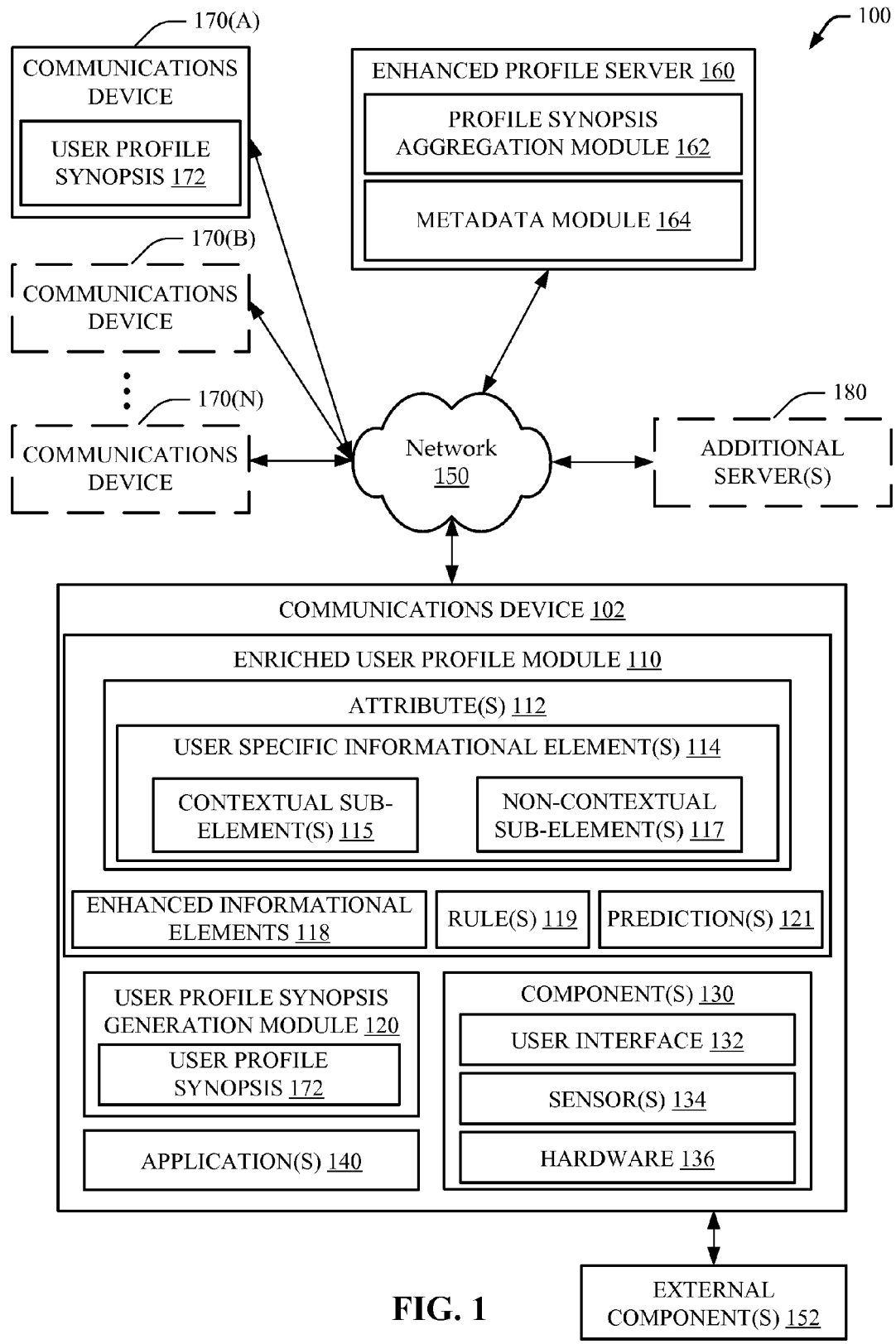
FIG. 1 depicts a block diagram of a communications system in which an enriched user profile is used, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A "user" disclosed herein may be construed broadly to include any entity interacting with, contributing information to, and/or obtaining information from a device.

A "user specific informational element" disclosed herein may include an informational element that provides insight into one or more attributes associated with the user. Examples of a user specific informational element include, but are not limited to, a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof. The user specific informational element may be obtained through device inference (e.g., derived by a device component based on a user behavior), user input, server provided information, etc., or any combination thereof.

A "component" disclosed herein may include any feature associated with the device from which attribute information may be obtained. Examples of a component include, but are not limited to, an application associated with the device, a sensor associated with the device, hardware associated with the device, etc., or any combination thereof.

An "attribute" disclosed herein may include an interest and/or characteristic associated with a user. An attribute may include contextual and/or non-contextual information. An attribute may include relevance information (e.g., a percentage likelihood of how interested a user is in the user specific informational element) and/or probability information (e.g., a percentage likelihood that an obtained user specific informational element is accurate).

A "user profile" disclosed herein may include an organizational structure available for storing, modifying, removing, and/or accessing one or more attributes associated with the user.

A "profile synopsis" disclosed herein may include a summary of at least a portion of the user profile. The profile synopsis may be generated by removing at least a portion of one or more user specific informational elements (e.g., specific location, place, time, etc.) from a user profile to assure a degree of privacy protection for the user.

An "enhanced informational element" disclosed herein may include information derived by a profile server from analysis of a plurality of profile synopses. A profile server may aggregate profile synopses from a plurality of device and determine one or more informational elements that may be missing from and/or may enhance an individual profile synopsis.

A "profile server query" disclosed herein may include a request for additional, supplemental, clarifying and/or replacement information. This request may be sent to a profile server to allow the profile server to leverage greater access to information from one or more other servers and/or profile synopsis aggregation derived information in fulfilling the request.

"Metadata" disclosed herein may include information that is obtained by a profile server in response to a profile server query. Metadata may be stored in a metadata repository.

An "enriched user profile" disclosed herein may include a user profile that is augmented by one or more enhanced informational elements and/or metadata. In one aspect, augmentation may include modifying, removing, and/or adding elements to one or more attributes associated with the user profile.

A "proxy user identifier (ID)" disclosed herein may include an ID that identifies the user device without uniquely identifying the user of the device.

According to one or more aspects, an enriched (e.g., smart) profile may be provided including both client and server components. The enriched profile may be operable to infer and/or predict one or more types of user needs or behaviours. The enriched profile may provide a personalized device experience and/or may optimize device performance with respect to a user's interaction with applications, services, etc. The personalized and/or optimized device experience may be achieved by maintaining a dynamic profile of a user on the device that can be modified based on factors such as, but not limited to, where the user is, who the user is, whom the user is with, how the user uses the device, etc. Examples of types of content collected by a device include application downloads, application use, internet browser history, device features used, bearers used, sensor measurements, physiological data, psychological data, etc. Time, date, location, and/or place information associated with the content may also be captured.

In operation, the user device may periodically communicate with a profile server to further augment the profile (e.g., with aggregate information mined from other users' profiles). Further, a user profile may be enriched through taking discrete activities and aggregating/coalescing these activities into higher-level actionable information about the user, how the user uses the device, how the user interacts with services, etc. In addition to understanding the user's past behaviour, the enriched user profile may also predict future events, actions, etc. (e.g., what is a next likely thing that the user may want based on an understanding of the user's profile and recent context). The enriched user profile information may be made available to applications running on the user device and/or other device software/components responsible for optimizing device performance, thereby allowing the user to experience personalized and/or optimized interactions with applications and/or any other aspect of the functions of the device. To enable further personalization and/or optimization, one or more aspects of the enriched user profile may be accessible to the user to allow the user to make adjustments to inferences, suggestions, predictions, etc.

FIG. 1 illustrates a block diagram of an exemplary system 100 in which an enriched user profile is operable. System 100 may include a plurality of communications devices 102, 170(A), 170(B), 170(N) (e.g., terminals, clients, UEs), which can communicate with each other and/or one or more servers, such as enhanced profile server 160 and additional servers 180, via network 150. In one aspect, devices 102, 170(A), 170(B), 170(N) may be operable to communicate using wireless protocols, such as, but not limited to, LTE, CDMA, TDMA, FDMA, OFDMA, SC-FDMA, TD-SCDMA, Global System for Mobile Communications (GSM), Universal Terrestrial Radio Access (UTRA), Evolved UTRA (E-UTRA), etc. In another aspect, devices 102, 170(A), 170(B), 170(N) may be operable to communicate using wired communications such as systems based on coaxial cable, fiber optic cable, twisted pair, digital subscriber line (DSL), etc.

Communications device 102 may include enriched user profile module 110, user profile synopsis generation module 120, one or more components 130, and one or more applications 140 (e.g., third party applications, etc.). Enriched user profile module 110 may provide the ability to infer and/or predict types of user need and/or behaviour, in order to personalize the user's experience with the communications device 102 and/or to optimize device performance with respect to the user's interaction with the communications device 102. In one aspect, enriched user profile module 110 may include one or more attributes 112 that may be supplemented with and/or augmented by enhanced informational elements 118 obtained from the profile server 160. Each of the one or more attributes may include one or more user specific informational elements 114. In one aspect, each of the user specific informational elements 114 may include one or more contextual sub-elements 115 and/or one or more non-contextual sub-elements 117.

An attribute 112 may include, but is not limited to one or more user interests and/or characteristics. In one aspect, an interest and/or characteristic may be stored as user specific informational element 114. Further, an attribute 112 may include relevance information (e.g., a percentage likelihood of how interested a user is in the user specific informational element) and/or probability information (e.g., a percentage likelihood that an obtained user specific informational element is accurate).

Further, a user specific informational element 114 may include an informational element that provides insight into one or more attributes associated with the user. Examples of a user specific informational element include, but are not limited to, a user interest, place information, location information, communications device sensor 134 derived data, communications device hardware 136 derived data, a user characteristic, user demographics information, a browser history, application usage history, a call history, communications device background activity, traffic utilization data, a communications device charge level, a communications device charge state, user input, etc., or any combination thereof. The user specific informational element may be obtained through device inference (e.g., derived by a device component based on a user behavior), user input, server provided information, etc., or any combination thereof.

A contextual sub-element 115 may include a number of items associated with a user. By way of example and not limitation, a contextual sub-element may include one or any combination of, a location associated with a user, a time of day, a day of the week, an activity associated with the user, a level of user interaction with the communications device 102, a user's recent interaction with the communications device 102, an available resource (e.g., battery current, memory, processing capabilities, etc.) associated with the communications device 102, a sensor 134 output (e.g., movement, indoors/outdoors from light sensors, etc.) associated with the communications device 102, a battery life value associated with the communications device 102, news relevant to the user, an item scheduled in a calendar application, a tasks application, a notes application, a contacts application, etc., weather information, traffic information, a proximity value of the communications device 102 to one or more other devices (e.g., 170(A), 170(B), 170(N)), a proximity value of the communications device 102 to one or more other users, server (e.g., 160, 180, etc.) derived content, availability of one or more data bearers (e.g., 3 G/4 G, Wi-Fi), a power usage value (e.g., when device is docked/plugged/charging), camera usage, site browsing history, purchasing patterns, etc.

Further, a non-contextual sub-element 117 may include, but is not limited to, one or any combination of, a user's gender, the user's age, another device associated with the user (e.g., 170(A), 170(B), 170(N)), the user's media (e.g., audio, video, visual, etc.) interest, the user's financial information, the user's game interest, an association with a second user, the user's profession, etc.

Additionally, enriched user profile module 110 may include one or more rules 119 and one or more predictions 121 to assist in information management. Enriched user profile module 110 may be operable to dynamically and/or semi-statically use and/or change a rule 119 for obtaining, storing, modifying, and/or accessing an attribute 112. In one aspect, a rule 119 may prompt the enriched user profile module 110 to change an attribute 112 based on a behavior determined (e.g., inferred from data captured by component 130) by enriched user profile module 110. In another aspect, enriched user profile module 110 may request an update to a rule 119 from server 160 to allow for further information to be inferred from captured data. In other words, the updated rule 119 may provide insight into what usage of an application may allow enriched user profile module 110 to infer about a user, etc. In one aspect, a rule 119 may be used to infer information by linking together combinations of behaviors (e.g., visiting a site, using an application, and making frequent calls from the site, then the enriched user profile module 110 may infer the site is the user's work place). In another aspect, a rule 119 may expire after a threshold time duration (e.g., an hour, a day, etc.). In another aspect, a rule 119 may expire outside a threshold distance from a location (e.g., work, home, etc.). In another aspect, a user may input a rule 119 and/or modify an existing rule 119. In operation, each rule 119 may provide insight into a user's behavior (e.g., allow enriched user profile module 110 to infer information from captured data). Each rule 119 may associate one or more patterns with an inferred element. For example, a user's recent activity/contexts may be similar to one or more patterns stored amongst historic data, and rule 119 may infer a future activity/context based on matching the historic data with the user's recent actions. In such an aspect, a sequence of events stored amongst historic data may be used to match a sequence of recent events.

In one aspect, a prediction 121 may use a mathematical model to predict a future event. For example, a maximum likelihood estimate (MLE) may be used. In one aspect, prediction 121 may analyze a user's recent activity/context and find similar patterns among historical data. In such an aspect, a sequence of historical activities/contexts may be helpful in predicting a future event. Further, in an aspect, capital theta "$\Theta$" represents all possible parameters. Lower case theta "$\theta$" represents an estimate of parameters from at least a subset of all the possible parameters. A activity/context "C" may include multiples instances, where each instance "c" may include one or more features, such as but not limited to, place "p", time "t", activity "b", bearer "b", power "w", etc. (e.g., $c_i = \{p_i, t_i, a_i, b_i, w_i\}$). In such an aspect, the multiple instances (e.g., n-2, n-1, n) of context "c" are represented by "$c_{n-2}$, $c_{n-1}$, $c_n$". A conditional portability "X" represents the likelihood of a similar or the same occurrence of "c" at an unknown instance "n+1." In such an aspect, $\Theta$ may be used to define a set of all possible parameter values (e.g., $P_{home}$, $P_{work}$, $P_{gym}$) for a discrete probability distribution, and $\theta$ may be used to define an estimate of parameters from a given sample (e.g., $c_{n-2}$, $c_{n-1}$, $c_n$). The defined estimate of parameters may be defined to be within the set of all possible parameter values (e.g., $\theta \in \Theta$). A MLE probability may be defined using Equation (1) in Table 1, and a MLE probability may be defined for discrete samples (e.g., $c_{n+1}$) using Equation (2) in Table 1.

TABLE 1

Probability Equations

| | |
|---|---|
| Equation (1) | $\theta_{MLE} = \text{argmax } P(\theta \mid c_{n-2}, c_{n-1}, c_n)$, where $\theta \in \Theta$ |
| Equation (2) | $P(c_{u+1} = X \mid c_u, c_{u-1}, c_{u-2}) = \dfrac{(c_{n-2}, c_{n-1}, c_n, X)}{(c_{n-2}, c_{n-1}, c_n)}$ |

In an aspect in which Equations (1) and (2) are used to assist in predicting a future occurrence, a rule 119 may also be available to calculate a distance between any arbitrary $c_{x-i}, \ldots, c_x$ and $c_{y-i}, \ldots, c_y$. In one aspect, prediction 121 may provide various other mathematical models to predict a future event, such as but not limited to, time series analysis, temporal point process analysis, support vector machine, etc.

User profile synopsis generation module 120 may be operable to generate a user profile synopsis 172 (e.g., profile summary). In one aspect, to prompt the generation of the user profile synopsis 172, an API call (e.g., anonymous API call) may be used to retrieve enrichment data (e.g., enhanced informational elements) from the profile server 160 and to contribute data to a profile server 160 profile synopsis aggregation module 162 to create future data models. In operation, user profile synopsis generation module 120 may be provided access to one or more user specific informational elements 114 by enriched user profile module 110. In such an aspect, enriched user profile module 110 may remove one or more contextual sub-elements 115 from a user specific informational element 114 prior to providing the user specific informational element 114 to the user profile synopsis generation module 120. In one aspect, the number and/or type of contextual sub-elements 115 removed from user specific informational element 114 may depend on privacy settings associated with the enriched user profile module 110.

Component 130 may include user interface 132, one or more sensors 134, and/or one or more hardware components 136. In one aspect, a component 130 may operate in conjunction with one or more external components 152. In one aspect, external components 152 may include a user interface, a sensor, a hardware component, a docking station, a cradle, a charging station, etc. In one aspect, user interface 132 may include various features, such as a display, user input and output mechanisms, etc. In one aspect, the one or more sensors 134 may include, but are not limited to, an accelerometer, a gyroscope, a proximity sensor, a light sensor, etc. In another aspect, sensors 134 may further refer to any sensor with which communications device 102 is operable to interact (e.g., breathalyzer, wind gauge, thermometer, barometer, altimeter, pedometer, heart rate monitor, blood pressure monitor, blood sugar monitor, etc.). In one aspect, a hardware component 136 may include, but is not limited to, one or more antennas, a battery, a GPS monitoring module, etc.

In operation, component 130 and/or external component 152 may be operable to capture data for use by enriched user profile 110. By way of example and not limitation, component 130 may be operable to capture application usage (e.g., minutes each application is used), internet browsing history (e.g., individual site addresses, number of times each site is visited, amount of time on each site, etc.), radio bearer availability (e.g., Wi-Fi, 3 G/4 G, etc.), communications device 102 charging state (e.g., connection to power supply), communications device 102 location, communications device 102 motion state (e.g., traveling in car, walking, stationary, etc.) In one aspect, a degree of granularity (e.g., specificity of information captured) may be configurable by the enriched user profile module 110. In another aspect, an amount, type, frequency, etc., of data captured by component 130 may be varied based on considerations such as, but not limited to, performance and quantity of data, foreground/background application running status, etc. In still another aspect, absence, presence, and/or a functionality of an external component 152 may affect one or more functionalities associated with a component 130, an application 140, etc.

Application 140 may assist in performance of a specific task associated with communications device 102 usage. Application 140 may be preinstalled on the device and/or downloaded by the user. In one aspect, application 140 may provide personalized content to communications device 102. In one aspect, applications 140 may provide an enhanced user experience through interaction with an additional server 180 and enhanced profile server 160 by receiving information related to the user that allows for focused content (e.g., advertisements, personalized content, etc.) to be provided to the communications device 102 while providing the user with enhanced levels of privacy. In this manner, the focused content may be provided in such a manner as to limit exposure of user specific information to application 140 and/or the additional server 180.

In another aspect, one or more applications 140 and/or enriched user profile module 110 may be operable to communicate with one or more other devices, e.g., 170(A), 170(B), 170(N), etc., and/or one or more other applications 140 to collect, share, display, etc. information associated with the user of communications device 102. In such an aspect, a user may move among interactions with various devices while still maintaining a personalized and/or optimized experience.

In operation, enriched user profile module 110 may provide mechanisms to allow an application 140 to query for various types of information, such as but not limited to, historical data (e.g., when did this user last use the alarm clock), aggregate data (e.g., is the user a low, medium or high data user?), inferred data (e.g., is the user currently at home? work? etc.), predictive data (e.g., when will the user next be on Wi-Fi? When are they next likely to have a period of downtime?), etc. In one aspect, enriched user profile 110 may publish one or more user specific informational elements 114 that may be queried by application 140. Such user specific informational elements 114 may include, but are not limited to values provided in Table 2.

TABLE 2

Example informational elements with example data values

| Informational Element | Example Data Points |
|---|---|
| profile.person.gender | <male, female, assumed_male, assumed_female, unknown> |
| profile.person.age | <0-18, 18-25, 25-39, 39-50, 50-100, unknown> |

TABLE 2-continued

Example informational elements with example data values

| Informational Element | Example Data Points |
|---|---|
| profile.person.segment | <adventurous, young active fun, etc> |
| profile.person.interests | <sport, hockey, travel, fashion, finance, games, etc> |
| profile.person.interests.sport | +5 |
| profile.person.interests.sport.football | +8 |
| profile.person.interests.fashion | −10 |
| profile.person.keywords | Finance, International Politics, Pop Music, Movies |
| profile.location.current | <work, home, play, travel, holiday> |
| profile.location.home.time.next | "8/3/2011 17:00:00" |
| profile.device.camera | <often, seldom, never> |
| profile.device.camera.last | "1/2/2011 21:02:05" |
| profile.device.bearer.wifi | <often, seldom, never> |
| profile.device.bearer.wifi.next | "9/3/2011 09:10:00" |
| profile.device.bearer.wifi.next.confidence | <high, medium, low> |

Continuing the above operational example, enriched user profile 110 may enhance a user experience through augmenting/supporting a variety of applications/services provided through communications device 102. For example, data associated with enriched user profile 110 may be used to personalize applications/services. In another example, data associated with enriched user profile 110 may be used to optimize device performance. In another example, data associated with enriched user profile 110 may be used to optimize resource usage. Data associated with enriched user profile 110 may further be used to make existing applications function more effectively. For example, by determining when/if a user will be on Wi-Fi, an application can optimize when to send/receive data. In another example, by determining when the user is at a specific location (e.g., work), enriched user profile module 110 can allow an application to determine when an optimal time may be to perform various tasks (e.g., check email, updated calendar, etc.). In still another example, one or more of an address book associated with communications device 102, a home screen associated with user interface 132, call handling features, etc., may be modified based on information about the user's current mode so as to provide a user with a more contextually relevant experience. In another example, one or more user specific informational elements 114 may be used to predict future events, usage, location, etc. In another example, one or more user specific informational elements 114 may be used to optimize device performance. Enriched user profile 110 may predict when, where, how, and/or with whom, an event may occur and may provide the ability for application 140 to pre-fetch data and/or delay retrieval of data for use by the user. For example, a news application may download (over Wi-Fi) relevant articles before the communications device 102 leaves a Wi-Fi coverage area.

Enhanced profile server 160 may include profile synopsis aggregation module 162 and metadata module 164. Profile synopsis aggregation module 162 may generate one or more enhanced informational elements by aggregating informational elements received from user profile synopsis 172 associated with users of the one or more communications devices (e.g., 102, 170(A), 170(B), 170(N)) to determine additional contextual information from the group of users that may not be available to any single user. In one aspect, at most one user profile synopsis 172 from each user may be provided during a group profile aggregation period. As such, there may be no duplicate profiles thereby giving profile synopsis aggregation module 162 the ability to create a useable/consistent data model. In one aspect, because enhanced profile server 160 does not keep a unique ID associated with each device (e.g., 102, 170(A), 170(B), 170(N), etc.) device anonymity may be preserved.

Further, during aggregation, a user's profile synopsis 172 may be incrementally added to a group profile thereby avoiding storage of any single profile synopsis 172 alone by the profile server as its own set of data. Through avoiding storage of user specific data in its own set, the system 100 may enhance privacy, by providing data anonymity (e.g., the profile synopsis may not be stored by the profile server 160, rather the aggregate data model may be stored). Such a system 100 further assures that it may not be possible or readily achievable to reverse engineer a specific user ID and/or communications device 102 ID. In other words, when the user profile synopsis 172 is sent to the server 160, profile synopsis aggregation module 162 adds the information to an overall aggregate data model, at which point the link of informational elements to a specific user is lost and/or disassociated.

In one aspect, metadata module 164 may include contextual information to supplement a user profile based on a user specific informational element. In one aspect, where a metadata query includes a specific website (e.g., a sports website), the enhanced profile server 160 may prompt the communications device 102 to modify various attributes of the enriched user profile module 110. For example, the visiting of a sports website may increment (a percentage value or an absolute value) an interest level in sports for the user. Further, assuming the sports website focuses on coverage of a specific professional sports team, visiting the site may decrement the user's potential availability for other activities when the team is playing a televised game. In another aspect, where it is known that ahead of major sports events, sales of items to enhance a home entertainment experience increase (e.g., sales of sofas, televisions, recliner chairs, etc.), a user's interest in the sporting event may increment the user's potential interest deals related to home entertainment enhancement items. In one aspect, the query may be prompted by a user request. In another aspect, the query may be performed automatically in response to the enriched user profile module 110 detecting a potential need and/or area of interest in which a complete data set may not currently be available.

In one aspect, enhanced profile server 160 may further segment users based on their on-device profile data. For example, a user who regularly accesses finance related websites and has a high volume of email traffic is likely high/medium net worth business person. This segmentation may be performed on the enhanced profile server 160 and the results may be provided to communications device 102 where the results may be used to enhance the profile by providing a mechanism for logically grouping users.

In another aspect, enhanced profile server 160 may provide relevant information to communications device 102 based on user's context (e.g., a user arrives in a different part of the world, so may have a different set of needs and possible interactions with services). In one aspect, when communications device 102 interacts with enhanced profile server 160 the communications device 102 may identify itself via a proxy user ID. This proxy user ID helps to ensure that an identity of the end user may not be known to the server 160 and/or one or more other servers 180. Further, a retention policy may be in place for server 160 stored data so as to comply with industry norms/standards. In one aspect, if a user opts out (e.g., wipes their device side profile clean), this action may also initiate a server side purge of that user's data.

According to an aspect, enriched user profile module 110 may provide higher-level actionable information about the user, how the user uses the communications device 102, how the user interacts with services, and in turn enriched user profile module 110 may predict future events, actions, etc. Through use of one or more communications devices (e.g., 102, 170) and/or one or more servers (e.g., 160, 180), enriched user profile module 110 may provide enhanced access to aspects of how, when, and where a user uses his/her device, enhanced privacy by maintaining detailed user information in storage on the communications device 102, enhanced group data aggregation usage, enhanced data retrieval efficiency by reducing occurrences of data transfer between the communications device 102 and user profile server 160, enhanced responsiveness by providing sufficient data to allow applications and/or services to quickly access user profile information, thus allowing them to react in near real-time, (e.g. walking by a shop that is broadcasting a catalogue of offers, etc.), enhanced substantially continuous data connectivity by not requiring server access (e.g., may work in an offline mode, airplane mode, etc.). In an optional aspect, enriched user profile module 110 may function without input/interactions with enhanced profile server 160. This option may be available to provide a user looking for very strong control of user data at the potential expense of less functionality.

Therefore, according to one or more aspects, enriched user profile module 110 may provide improved privacy, improved data efficiency, richer user profile, and relative device autonomy with near real-time responsiveness.

FIGS. 2-4, 12-14, and 19 illustrate various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 2:
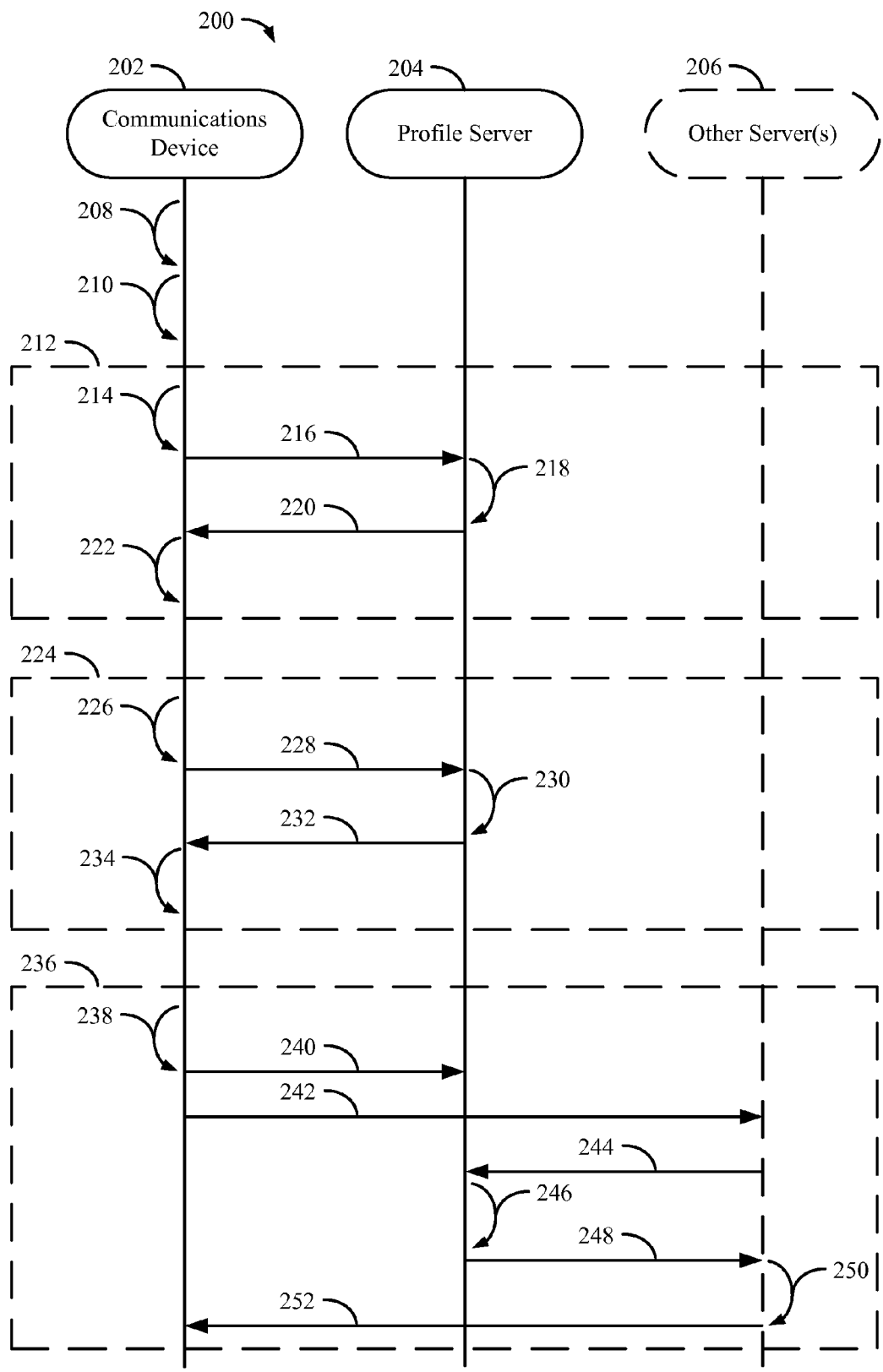
FIG. 2 depicts a call flow diagram conceptually illustrating communications within a communications system in which an enriched user profile is used, according to an aspect.

FIG. 2 depicts a call flow diagram conceptually illustrating communications within a communications system 200 in which an enriched user profile is used, according to an aspect. Communications system 200 may include communications device 202 and profile server 204. In an optional aspect, communications system 200 may further include one or more other servers 206.

At 208, a user profile may be populated with one or more attributes associated with a user. In one aspect, the user profile may be populated through user input, server provided information, default values, etc., or any combination thereof.

At 210, the populated user profile may be supplemented and/or modified based on data captured by one or more components associated with communications device 202. Each attribute may include one or more user specific informational elements. As noted above, examples of a user specific informational element may include, but are not limited to, a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof. The user specific informational element may be obtained through device inference (e.g., derived by a device component based on a user behavior), user input, server provided information, etc., or any combination thereof.

As depicted in FIG. 2, various functional options are depicted as dashed blocks (e.g., 212, 224, 236). For example, dashed block 212 illustrates a process to enrich user profile information with enhanced informational elements available from profile server 204, dashed block 224 illustrates a process to provide metadata to a communications device 202, and dashed block 236 illustrates a process by which a portion of user specific information may be obtained by one or more applications and/or one or more other servers 206 so as to provide communications device with personalized content.

In dashed block 212, at 214 a communications device may aggregate information from the user profile into a profile synopsis. In one aspect, aggregation may include removal of one or more elements that may individually identify the user (e.g., place, location, etc.). At 216, the profile synopsis may be communicated from the communications device 202 to profile server 204. In one aspect, this communication may occur once during a profile synopsis aggregation period so as to assure an accurate data set is provided to the profile server 204. In one aspect, communications device 202 may transmit the profile synopsis upon completion of the aggregation process. In another aspect, communications device 202 may wait to transmit the profile synopsis until receiving a prompt from profile server 204. In another aspect, the communications device 202 may determine when to transmit the profile synopsis based on one or more factors, such as but not limited to, bearer availability, device power level, user input, etc.

At 218, profile server 204 may aggregate information obtained from profile synopses from multiple communications devices 202. In one aspect, such aggregation may include grouping information into various categories, activities, etc. In such an aspect, the aggregated profile synopses may include data that individually transmitted profile synopsis' did not include. For example, a first communications device may transmit a profile synopsis include information A, B, and C, and a second communications device may transmit a profile synopsis including information A, C, and D. Profile server 204 may group these informational elements into a group A, B, C, and D.

At 220, profile server 204 may transmit one or more enhanced informational elements to at least a portion of communications devices 202. Continuing the able example, profile server 204 may transmit an enhanced informational element "D" with instructions to include "D" within a grouping associated with "A, B, and C."

At 222, communications device 202 may update the user profile with one or more enhanced informational elements received from profile server 204. In one aspect, updating may include supplementing existing information within the user profile. In another aspect, updating may include replacing information existing within the user profile with the received enhanced informational element.

In dashed block 224, at 226, communications device 202 may determine that additional information may improve a user experience. In one aspect, such a determination may occur based on a determination that an information set is incomplete. In another aspect, such a determination may occur based on an occurrence of an event for which information is not available. The communications device 202 may generate a profile server query in response to the determination.

At 228, the communications device 202 may transmit the profile server query to profile server 204. At 230, profile server 204 may process the received query and may determine if any informational elements are available that may be responsive to the query. In one aspect, profile server 204 may search a metadata repository to attempt to obtain one or more informational elements associated with the query. Assuming profile server 204 is able to access one or more elements (e.g., metadata) associated with the query, at 232 the accessed metadata may be transmitted to communications device 202. At 234, communications device 202 may augment a user profile with at least a portion of the received metadata. In one aspect, augmentation may include adding the received metadata to information associated with one or more user profile attributes. In another aspect, augmentation may include replacing information associated with one or more user profile attributes with the received metadata.

In dashed block 236, at 238, communications device 202 may generate a proxy ID. In one aspect, the proxy ID may uniquely identify the communications device 202. In one aspect, the communications device 202 may generate a new proxy ID periodically, upon request, etc. The communications device may make the proxy ID available to one or more applications operable on and/or services operable with the communications device 202.

At 240, communications device 202 may communicate the proxy ID along with information associated with one or more attributes to the profile server. In one aspect, the information associated with the one or more attributes may be a profile synopsis. At 242, an application, service, etc., associated with the communications device 202 that has been provided access to the proxy ID may transmit the proxy ID to one or more other servers 206.

At 244, the other server 206 transmits the proxy ID to the profile server 204. At 246, the profile server 204 may authenticate the other server 204. In one aspect, authentication may be performed by comparing the proxy ID received from the communications device 202 with the proxy ID received from the other server 206. Assuming the proxy ID is authenticated, at 248 the profile server 204 may provide access to at least a portion of the one or more attributes received from the communications device 202. In one aspect, the profile server 204 may provide all information received from the communications device 202 to the other server 206. In another aspect, based on one or more filters (e.g., privacy, relevancy, etc.) applied by the profile server 204 only a portion of the information received from the communications device 202 may be provided to the other server 206.

At 250, the other server may process the information associated with the communications device 202 to determine one or more personalized content items. In one aspect, the personalized content item may include a targeted advertisement. At 252, the other server 206 may transmit the personalized content item to the communications device 202. In one aspect, the personalized content item may be communicated to the communications device 202 via the profile server 204.

Figure 3:
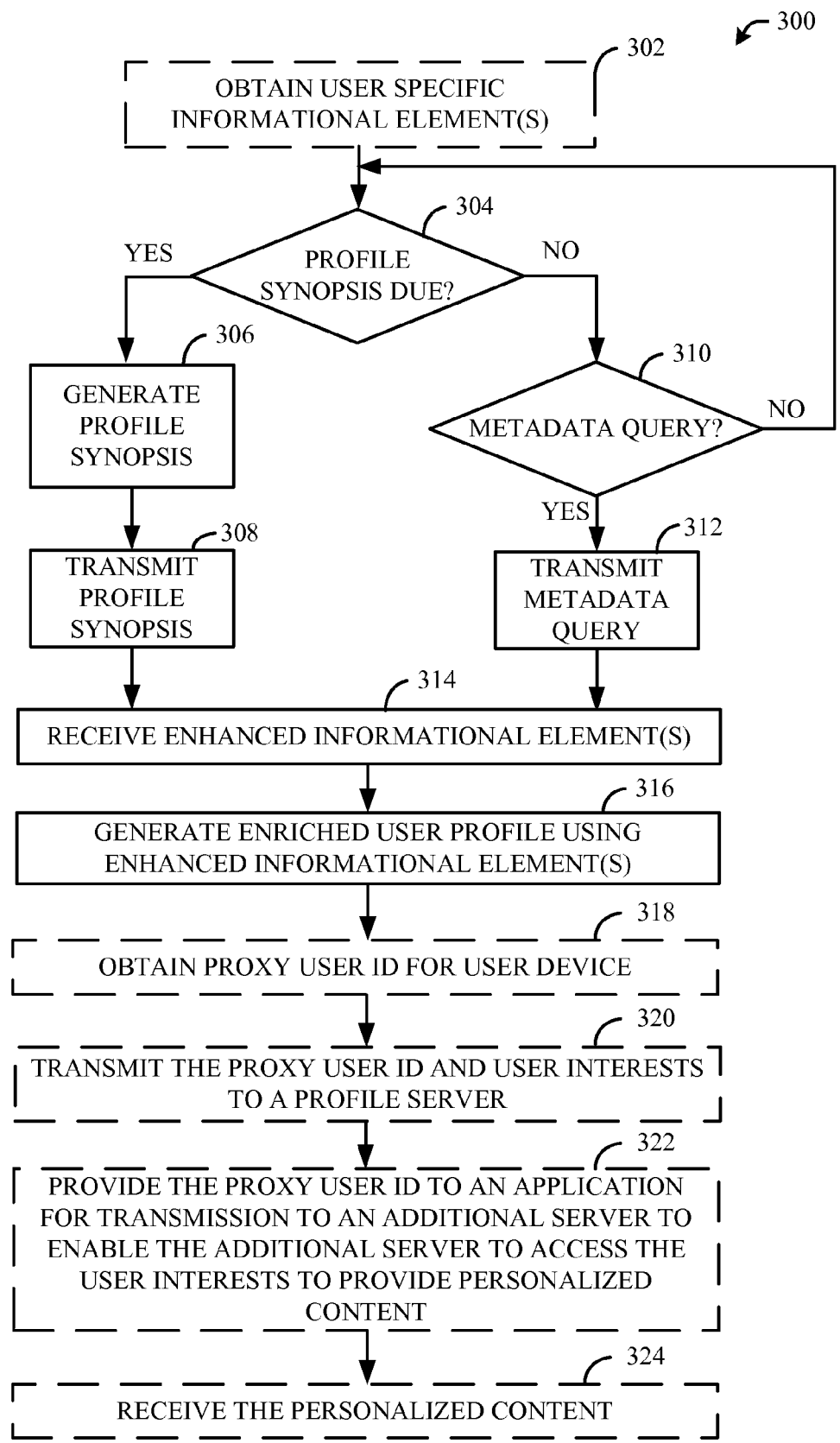
FIG. 3 depicts a flowchart describing an example system for generating and using an enriched user profile according to an aspect.

FIG. 3 depicts a flowchart 300 describing an example system for generating and using an enriched user profile according to an aspect. In one optional aspect, at block 302, a communications device may obtain one or more user specific informational elements. Examples of a user specific informational element may include, but are not limited to, a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof. The user specific informational element may be obtained through device inference (e.g., derived by a device component based on a user behavior), user input, server provided information, etc., or any combination thereof.

At block 304, the communications device determines whether a profile synopsis update to the server is due. In one aspect, to prompt the generation of the profile synopsis, an anonymous API call may be used to receive data from a profile server and/or to contribute data to a profile server. In one such aspect, at most one profile enrichment request may be made during a group profile aggregation period. As such, there may be no duplicate profiles thereby giving the profile server the ability to create useable/consistent data models. Further, a user's profile synopsis may be incrementally added to group profile information thereby avoiding storage of user specific content by the profile server as its own set of data. As such, when the profile synopsis is sent to the server, the information is added to an overall aggregate data model, at which point the link of informational elements to a specific user is lost and/or disassociated.

If at block 304, it is determined that a profile synopsis is due, then at block 306, the communications device may generate a profile synopsis and at block 308, the profile synopsis may be transmitted to a profile server. In an aspect, a profile synopsis may be a summary of user specific informational elements that have been abstracted into a higher level summary form, and the abstraction may include removal of one or more informational elements that may indicate a user's identity (e.g., place, location, etc.).

By contrast, if at block 304, it is determined that no profile synopsis is currently due, then at block 310 the communications device may still determine whether the profile server may be queried to assist in metadata interpretation associated with content residing on the communications device. In one aspect, the determinations performed at blocks 304 and 310 may be performed in parallel. In another aspect, the determinations may be performed in series where the order of actions is not limited to the order depicted in FIG. 3. In another aspect, only one of the determinations may occur. An example of metadata request is provided in the context of a communications device user specific informational element indicating a recent visit to a website. The communications device may query the profile server to determine additional contextual information (e.g., metadata) to supplement the user profile based on the user specific informational element. In one aspect, the query may be prompted by a user request. In another aspect, the query may be performed automatically in response to the communications device detecting a potential need and/or area of interest in which a full data set may not be available. If at block 310 the communications device determines a query may not be needed, then the communications device may end the process and/or return to monitoring for a profile synopsis request at block 304. By contrast, if at block 310, a metadata query is prompted, then at block 312 the query may be transmitted to the profile server.

In response to a profile synopsis transmission at block 308 and/or a metadata query at block 312, the communications device may receive one or more enhanced informational elements from the profile server and/or a metadata repository at block 314. The enhanced informational element may be associated with the user specific element and may include content that was obtained from the profile server. With respect to a response to a metadata query, the data returned may prompt the communications device to perform such actions as increment an interest in sports by X (percentage or absolute value). In another aspect, a response to a metadata query may provide the communications device information that it would not have determined itself (e.g., the place where the user is currently located is a restaurant which specializes in That food, and is very popular with students, or the website which the user has visited specializes in sports news for American audiences). For example, the enhanced informational element may be derived from server assisted event analysis (e.g., group behavior and/or interests based on aggregation of multiple profile synopses) and external data sources. External data sources may be used to obtain additional information associated with a user. For example, a current location may be used to obtain external data associated with crime rates in the neighborhood, average household income at the location, etc. In another example, a web site recently visited may be used by an external data source to obtain general contextual information (e.g., interest in sports, news, fashion, etc.). At block 316, the communications device may use at least a portion of the received enhanced informational element to generate and/or add to the enriched user profile.

Additionally, in an optional aspect, at block 318, a communications device may obtain a proxy user ID that identifies the user device without uniquely identifying the user of the device. In one aspect, the profile server may generate the proxy user ID and the communications device may receive the proxy user ID from the profile server. For example, in some aspects, for the greatest level of privacy (e.g., communications device anonymity), the proxy user ID may be generated in whole, or in part, by the profile server. In one aspect, the proxy user ID may be generated in response to a request from an application. In such an aspect, although the profile server may be able to "reverse engineer" back from a proxy ID to a real device or user ID, as the proxy ID may be deleted (e.g., thrown away after use), it may become significantly more challenging for a third party to reverse engineer a device or user ID from any proxy ID. In another aspect, the communications device may generate the proxy user ID. In such implementations, a device-side generated proxy ID may be used and relayed to the application while not revealing the mapping between device/user ID and proxy ID to a third party server. As such, the proxy user ID may be created as part of an enriched user profile, and in different implementations of the creating may be performed by the profile server, the communications device and/or a combination thereof. In one aspect, which entity is used to generate the proxy user ID may depend on the acceptable robustness setting to preserve user anonymity. In one aspect, each request from the application may prompt generation of a new proxy user ID. In another aspect, a new proxy user ID may be generated periodically. In still another aspect, the proxy user ID may be valid for a threshold duration of time, number of uses, etc.

In the optional aspect, at block 320, the communications device may transmit the proxy user ID and user interests to a profile server. In one aspect, the user interests may include one or more attributes associated with an enriched user profile. The enriched user profile may include one or more user specific informational elements.

In the optional aspect, at block 322, the communications device may provide the proxy user ID to an application and/or service operable on the communications device. In operation, the application may receive personalized content (e.g., an advertisement) for the user device by transmitting the proxy user ID to an additional server and receiving the personalized content from the additional server. In such an aspect, the additional server may communicate with the profile server using the proxy user ID to gain access to the user interests provided by the communications device. Thereafter, the additional server may use the user interests to determine one or more potentially relevant content items. From these potentially relevant content items, one or more personalized content items may be selected for communication to the user device. In one aspect, the additional server may register with the profile server and agree to various restrictions associated with usage of the user interests. For example, the additional server may be granted a limited duration during which the user interests may be used.

Thereafter, at block 324, the communications device may receive the personalized content.

Figure 4:
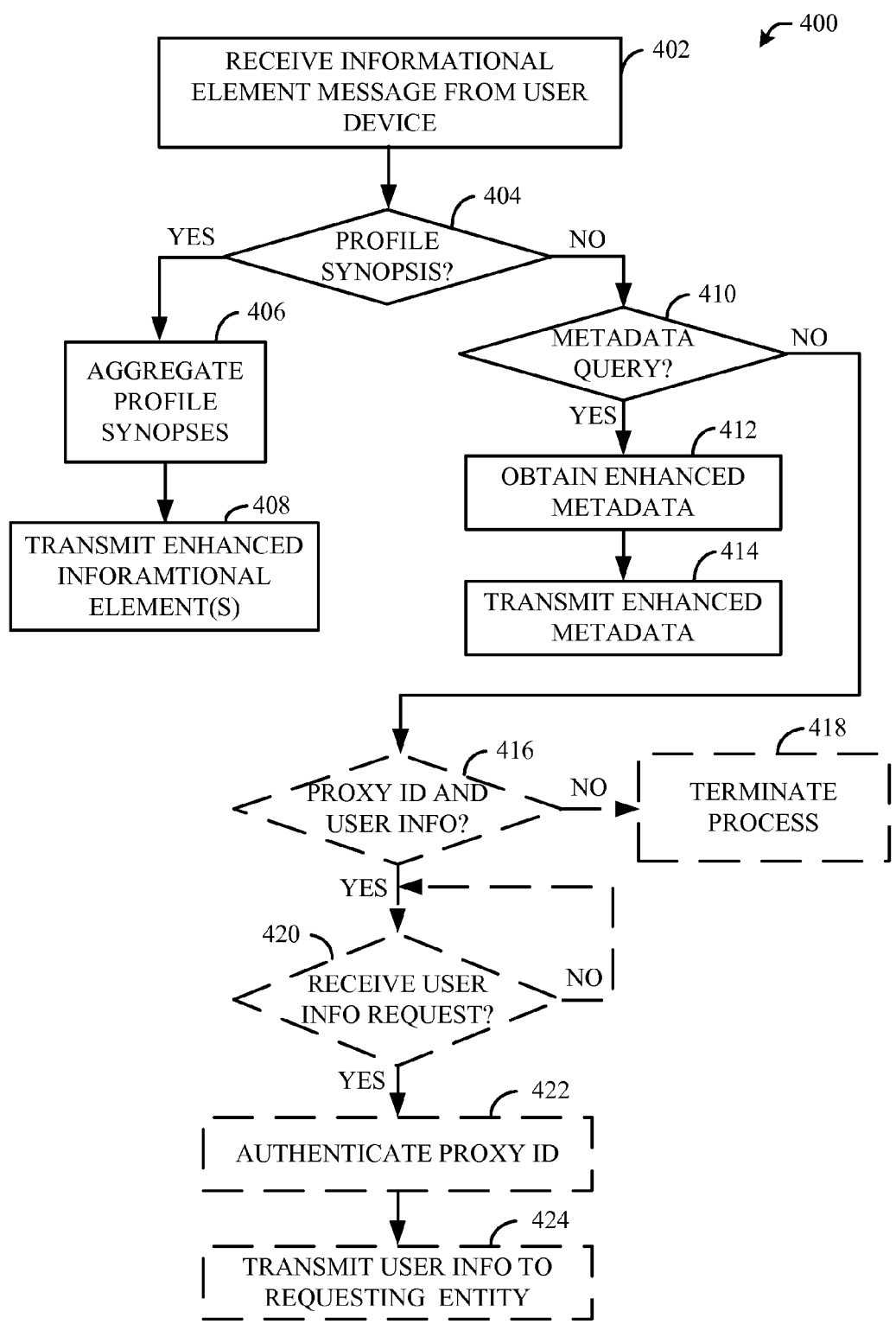
FIG. 4 depicts a flowchart describing an example system for predicting future event occurrence and modifying device functionality using an enriched user profile according to an aspect.

FIG. 4 depicts a flowchart 400 describing an example system in which an enriched user profile is used, according to an aspect. At block 402, a profile server may receive an informational element message from a user device (e.g., communications device 102).

At block 404, the profile server determines whether the received informational element message is a profile synopsis. If at block 404, the informational element message is a profile synopsis, then at block 406 the profile server may combine information included in the profile synopsis with a group model. In such an aspect, the received profile synopsis may be aggregated with one or more other profile synopses and/or other network obtained content. For example, the profile server may derive an enhanced informational element using server assisted event analysis (e.g., group behavior and/or interests based on aggregation of multiple profile synopses) and/or external data sources. External data sources may be used to obtain additional information associated with a user. For example, a current location may be used to obtain external data associated with crime rates in the neighborhood, average household income at the location, etc. In another example, a website recently visited may be used by an external data source to obtain general contextual information (e.g., interest in sports, news, fashion, etc.).

Based on analysis of the profile server aggregated informational model and the received profile synopsis, the profile server may determine one or more informational elements that are lacking in the received profile synopsis. At block 408, one or more enhanced informational elements (e.g., elements determined to be missing, out of date, inaccurate, etc.) may be transmitted to a communications device. In one aspect, the analysis and transmission may be performed in response to the reception of the profile synopsis. In another aspect, the transmission may be directed to the communications device from which the profile synopsis was received.

By contrast, if at block 404 the profile server determines that the informational element message is not a profile synopsis, then at block 410, the profile server determines whether the informational element message is a metadata query. If at block 410, the profile server determines that informational element message is a metadata query, then at block 412, metadata associated with the query may be obtained. In one aspect, the metadata may be obtained from a metadata repository. At block 414, the obtained metadata may be transmitted to the communications device from which the query was received.

By contrast, if at block 410 the profile server determines that the informational element message is not a metadata query, then in an optional aspect, at block 416, the profile server may determine if the informational element message includes a proxy user ID and one or more attributes associated with the user. In the optional aspect, if at block 416 the profile server determines that the informational element message is not a proxy user ID and one or more attributes, then at block 418 the process may terminate.

In contrast, in the optional aspect, if at block 416 the profile server determines that the informational element message is a proxy user ID and one or more attributes associated with a user, then at block 420, the profile server may determine if any requests have been received from another server to access the one or more attributes associated with the user. If no requests have been received at block 420, then the profile server may continue to store the proxy user ID and wait for a request from another server. In one aspect, the profile server may store the proxy user ID for a threshold duration, number of uses, etc., and may delete the proxy user ID after the threshold is exceeded.

In the optional aspect, if at block 420, a request is received, then at block 422, the profile server may authenticate the request. In one aspect, the request may include a copy of the proxy user ID and the authentication may include a comparison of the proxy user ID received from the communications device with the proxy user ID received as part of the request from another server. Assuming the authentication is successful in the optional aspect, then at block 424 at least a portion of the one or more attributes may be transmitted to the requesting server.

Figure 5:
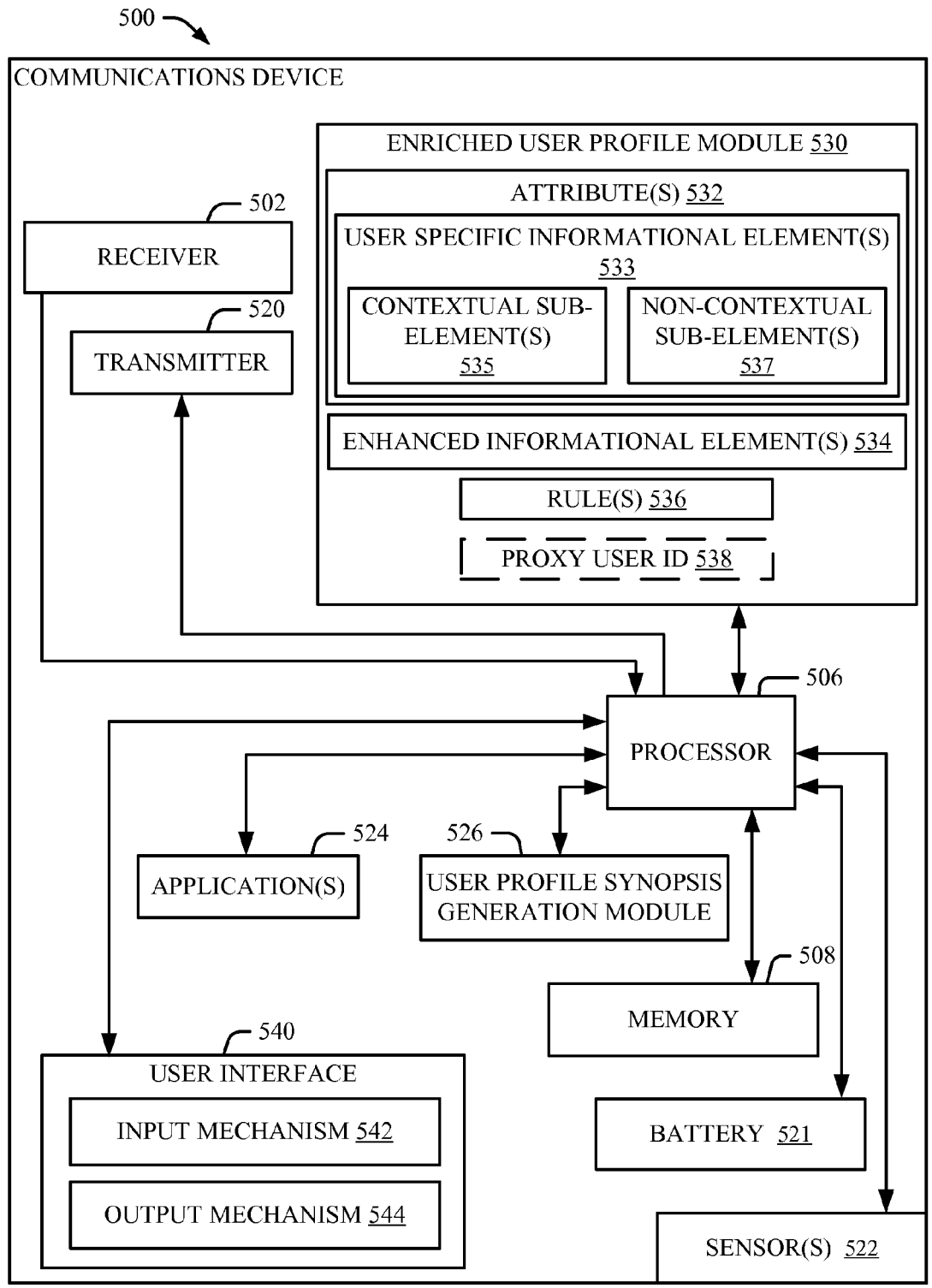
FIG. 5 depicts a block diagram of an example communications device for providing for an enhanced user experience through use of an enriched user profile according to an aspect.

FIG. 5 depicts a block diagram of an example communications device 500 for providing for an enhanced user experience through use of an enriched user profile according to an aspect. Communications device 500 comprises receiver 502 that receives one or more signals from, for instance, one or more receive antennas (not shown), performs typical actions on (e.g., filters, amplifies, downconverts, etc.) the received signals, and digitizes the conditioned signals to obtain samples. Receiver 502 can further comprise an oscillator that can provide a carrier frequency for demodulation of the received signal and a demodulator that can demodulate received symbols and provide them to processor 506 for channel estimation. In one aspect, communications device 500 may further comprise one or more secondary receivers and may receive additional channels of information.

Processor 506 can be a processor dedicated to analyzing information received by receiver 502 and/or generating information for transmission by one or more transmitters 520 (for ease of illustration, one transmitter is shown), a processor that controls one or more components of communications device 500, and/or a processor that both analyzes information received by receiver 502, generates information for transmission by transmitter 520 for transmission on one or more transmitting antennas (not shown), and controls one or more components of communications device 500.

In one aspect, processor 506 and/or enriched user profile module 530 may provide means for obtaining an attribute from a component operable on a communications device, means for generating a profile synopsis from the attribute by abstracting at least a portion of the user specific informational element from the attribute, means for transmitting the profile synopsis, means for receiving an enhanced informational element, and means for generating an enriched user profile by augmenting the attribute with at least a portion of the received enhanced informational element. The attribute can include a user specific informational element. The enhanced informational element can be derived from an aggregation of profile synopses from a plurality of devices. In another aspect, processor 506 and/or enriched user profile module 530 may provide means for generating a profile server query associated with an attribute by modifying at least a portion of a user specific informational element associated with the attribute to disassociate the attribute from a user, means for transmitting the profile server query, means for receiving an enhanced informational element including metadata associated with the profile server query, and means for generating an enriched user profile by augmenting the attribute with at least a portion of the enhanced informational element. The enhanced informational element can be received from a metadata repository. In an optional aspect, processor 506, and/or enriched user profile module 530 may be operable to provide means for generating a proxy user ID to identify a communications device, means for transmitting the proxy user ID and an attribute associated with a user, and means for providing the proxy user ID to an application that receives at least a portion of the attribute using means for transmitting the proxy user ID to allow an additional server to access the transmitted attribute, and receiving the personalized content from the additional server.

Communications device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.). In one aspect, memory 508 may include a UICC which may include various modules such as but not limited to, a subscriber information module (SIM), a CDMA Subscriber Identity Module (CSIM), etc.

It will be appreciated that the data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods is intended to comprise, without being limited to, these and any other suitable types of memory.

Communications device 500 may further include enriched user profile module 530, user profile synopsis generation module 526, one or more components such as battery 521 and one or more sensors 522, and one or more applications 524. Enriched user profile may include one or more attributes 532 associated with a user. Each attribute may include one or more user specific informational elements 533 and each user specific informational element may include at least one of a contextual sub-element 535 and/or a non-contextual sub-element 537. In one aspect, user specific informational elements 533 may be supplemented with an enhanced informational element 534 obtained from a profile server. Further, enriched user profile module 530 may include one or more rules 536 that assist enriched user profile module 530 in providing an enriched user experience. In one aspect, rule 536 provides a process by which current and/or future activities may be predicted.

User profile synopsis generation module 526 may be operable to generate a user profile synopsis (e.g., profile summary). In one aspect, to prompt the generation of the user profile synopsis, an anonymous API call may be used to receive enrichment data (e.g., enhanced informational elements) from a profile server and to contribute data to a profile server profile summary aggregation module to create future data models. Operation of enriched user profile module 530 is depicted in the flowchart of FIG. 3.

Application 524 may assist communications device in performing specific tasks. In an optional aspect, application 524 may provide an enhanced user experience through interaction with an additional server and enhanced profile server receive information related to the user. Application may obtain a proxy user ID 538 from enriched user profile module 530, and may use transmitter to transmit the proxy user ID 538 to an additional server. In one aspect, the proxy user ID 538 may be generated by the communications device 500. In another aspect, the proxy user ID 538 may be generated by a profile server and provided to communications device 500. Thereafter, the additional server may use the proxy user ID 538 for authentication and access to information associated with a communications device and stored on a profile server. In such an aspect, communications device 500 may receive personalized content (e.g., advertisements, etc.) while providing the user with enhanced levels of privacy. In other words, the personalized content may be provided in such a manner so as to limit exposure of user specific information to application 524 and the additional server.

Additionally, communications device 500 may include user interface 540. User interface 540 may include input mechanisms 542 for generating inputs into communications device 500, and output mechanism 544 for generating information for consumption by the user of communications device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver, etc. In one aspect, output mechanism 544 may include a display operable to present content that is in image or video format or an audio speaker to present content that is in an audio format. In one aspect, enriched user profile module 530 may provide contextually relevant content as an overlay to output mechanism 544. Enriched user profile module 530 may be used to provide an overlay to an application 524 running on the communications device 500 and thereby provide contextually relevant content to the user during use of the application 524. In another example, the enriched user profile module 530 may predict future events of interest and provide such events to the application 524 and output mechanism 544.

Figure 6:
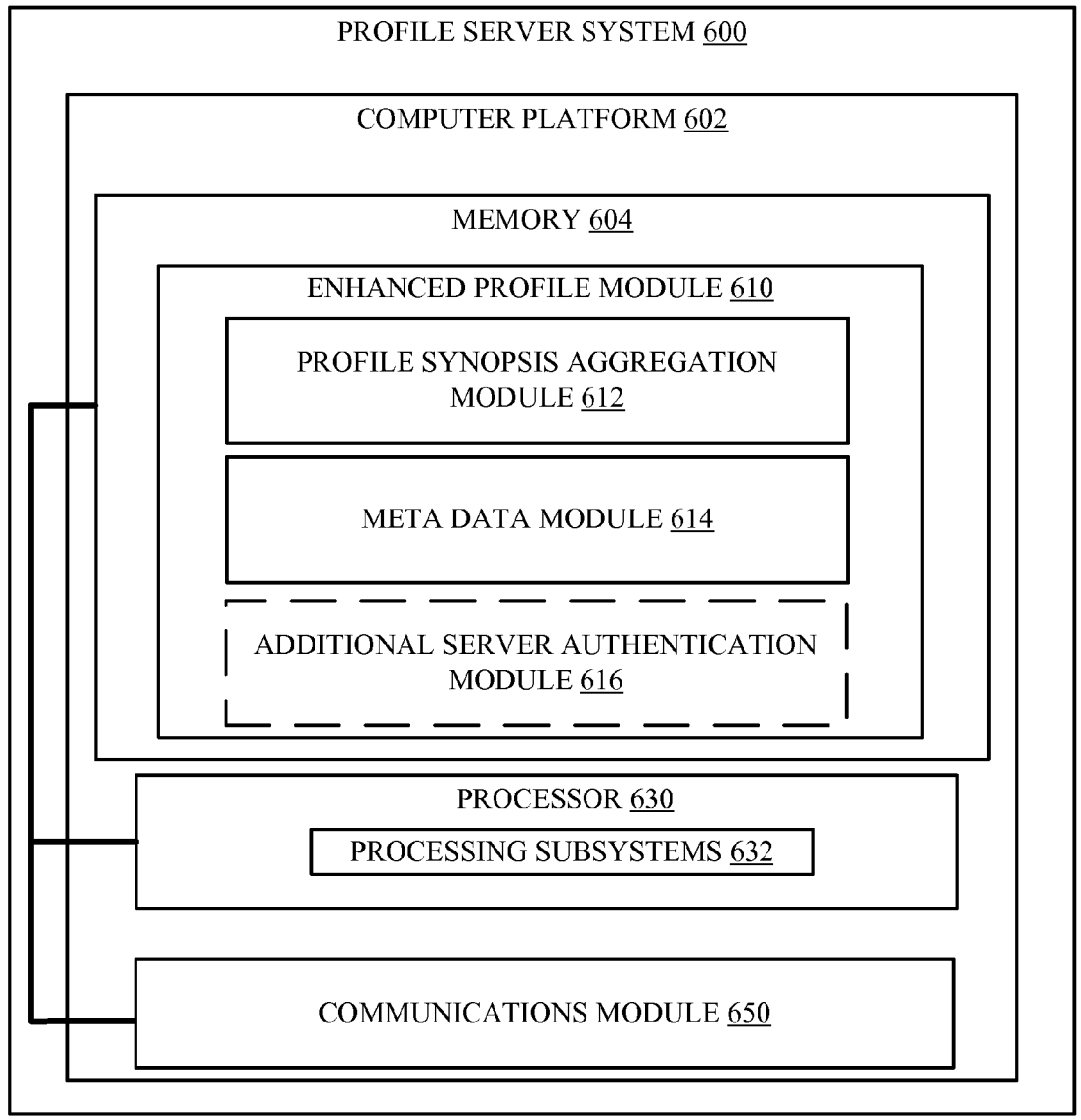
FIG. 6 depicts a block diagram of an example profile server for assisting in providing an enhanced user experience by augmenting content with enhanced informational elements according to an aspect.

FIG. 6 depicts a block diagram of an example profile server system 600 operable to assist in providing an enhanced user experience by augmenting content with one or more enhanced informational elements and/or metadata according to an aspect. Profile server system 600 may comprise at least one of any type of hardware, server, personal computer, mini-computer, mainframe computer, or any computing device either special purpose or general computing device. Further, the modules and applications described herein as being operated on or executed by profile server system 600 may be executed entirely on a single network device, as shown in FIG. 6, or alternatively, in other aspects, separate servers, databases or computer devices may work in concert to provide data in usable formats to parties, and/or to provide a separate layer of control in the data flow between devices, such as communications devices 102, 170(A), 170(B), 170(N), and the modules and applications executed by profile server system 600.

Profile server system 600 includes computer platform 602 that can transmit and receive data across wired and wireless networks, and that can execute routines and applications. Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of profile server system 600 and the operability of the network device on a wired or wireless network.

Processor 630, communications module 650, and/or enhanced profile module 610 may provide means for receiving a plurality of profile synopses from a plurality of communications devices and means for aggregating the informational elements from the plurality of profile synopses to generate an enhanced informational element. Each profile synopsis can include an informational element, and at least one of the informational elements may have been modified to remove at least a portion of user specific information from a user specific informational element available on a corresponding communications device.

Computer platform 602 further includes communications module 650 embodied in hardware, firmware, software, and combinations thereof, that enables communications among the various components of profile server system 600, as well as between profile server system 600, communications devices 102, 170(A), 170(B), and 170(N). Communication module 650 may include the requisite hardware, firmware, software and/or combinations thereof for establishing a communication connection. According to one or more of the described aspects, communication module 650 may include the necessary hardware, firmware and/or software to facilitate wireless and/or wireline communication between profile server system 600 and communications devices 102, 170(A), 170(B), 170(N).

Memory 604 of profile server system 600 can include an enhanced profile module 610 which may be operable to assist in providing an enriched user experience. Enhanced profile module 610 may include profile summary aggregation module 612, metadata module 614, and additional server authentication module 616. Profile summary aggregation module 612 may generate one or more enhanced informational elements by aggregating informational elements received from user profile synopses from a plurality of communications devices (e.g., 102, 170(A), 170(B), 170(N)). The enhanced informational element may provide additional contextual information available from the group of users that may not be available to any single user. In one aspect, at most one user profile summary from each user may be provided during a group profile aggregation period.

In one aspect, metadata module 614 may include additional contextual information to supplement, replace, etc., an informational element associated with a user profile. For example, where a metadata query includes a specific website (e.g., a sports website), the profile server system 600 may prompt a communications device 102 to modify various attributes of its enriched user profile. For example, the visiting of a sports website may increment (a percentage value or an absolute value) an interest level in sports for the user. Further, assuming the sports website focuses on coverage of a specific professional sports team, visiting the site may decrement the user's potential availability for other activities when the team is playing a televised game. In another aspect, interest in the specific professional sports team may increment the user's potential interest in hearing about deals related to new sofas, televisions, recliner chairs, etc. In one aspect, the metadata query may be prompted by a user request. In another aspect, the metadata query may be performed automatically in response to an enriched user profile detecting a potential need and/or area of interest in which a full data set may not be currently available.

In an optional aspect, additional server authentication module 616 may receive a proxy identification from a communications device along with one or more user interests. Additionally, additional server authentication module 616 may receive a request from one or more additional servers requesting access to the user interests. Additional server authentication module 616 may provide a portion of the user interests to an additional server upon completion of an authentication process. In one aspect, the additional server authentication module 616 may receive a proxy identifier from the additional server and may match the values to determine if access is authenticated. In one aspect, the proxy identifier expires after a threshold time duration.

Figure 7:
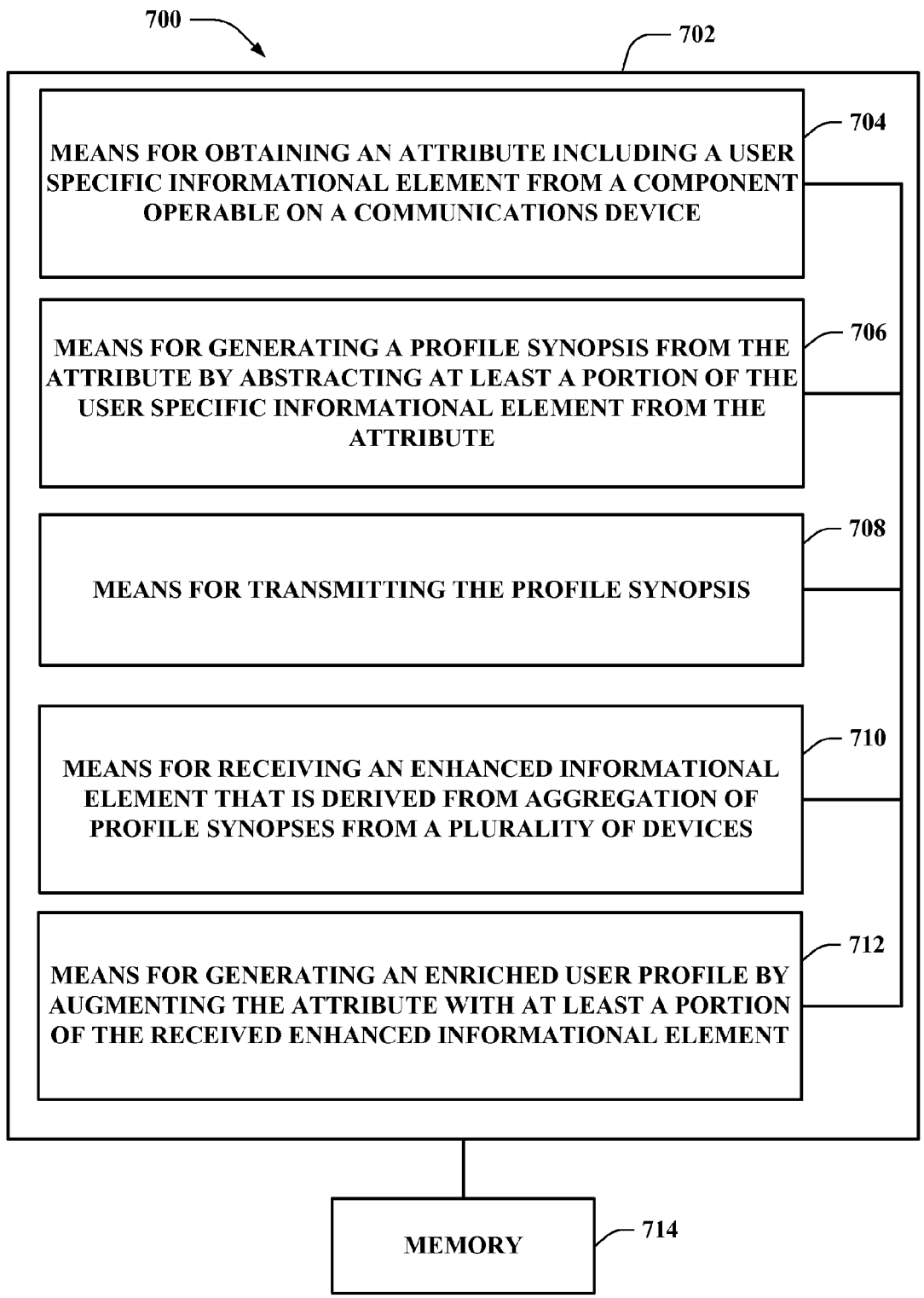
FIG. 7 depicts a block diagram of an exemplary communication system for using an enriched user profile, according to an aspect.

FIG. 7 depicts a block diagram of an exemplary communication system 700 operable to use an enriched user profile, according to an aspect. For example, system 700 can reside at least partially within a communications device (e.g., communications device 500). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for obtaining an attribute including a user specific informational element from a component operable on a communications device 704. In one aspect, the component may be an application associated with the communications device, a sensor associated with the communications device, a hardware component associated with the communications device, etc., or any combination thereof. In one aspect, the user specific informational element may be a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof. In one aspect, the electrical component 704 may further be operable to provide means for detecting a component type for the component, means for determining the attribute accessible from the component based on the component type, and means for extracting the attribute accessible from the component. In one aspect, each user specific informational element may include a contextual sub-element, a non-contextual sub-element, etc., or any combination thereof. In such an aspect, the contextual sub-element may include a location associated with a user, a time of day, a day of the week, an activity associated with the user, a level of user interaction with the communications device, a user's recent interaction with the communications device, an available resource associated with the communications device, a sensor output associated with the communications device, a battery life value associated with the communications device, news relevant to the user, an item scheduled in a calendar application, weather information, traffic information, a proximity value of the communications device to another device, a proximity value of the communications device to another user, server derived content, etc., or any combination thereof. In such an aspect, the non-contextual sub-element may include a user's gender, the user's age, another device associated with the user, the user's media interest, the user's financial information, the user's game interest, an association with a second user, the user's profession, etc., or any combination thereof.

Further, logical grouping 702 can include an electrical component that may provide means for generating a profile synopsis from the attribute by abstracting a portion of the user specific informational element from the attribute 706. In an aspect, the electrical component 706 may further be configured for removing a portion of a contextual sub-element of the user specific informational element. In such an aspect, the electrical component 706 may further be configured for removing location information, place information, etc., from the contextual sub-element.

Further, logical grouping 702 can include an electrical component that may provide means for transmitting the profile synopsis 708. Still further, logical grouping 702 can include an electrical component that may provide means for receiving an enhanced informational element. The enhanced informational element can be derived from aggregation of profile synopses from a plurality of devices 710. Moreover, logical grouping 702 can include an electrical component that may provide means for generating an enriched user profile by augmenting the attribute with at least a portion of the received enhanced informational element 712.

Additionally, system 700 can include a memory 714 that retains instructions for executing functions associated with the electrical components 704, 706, 708, 710, and 712, and stores data used or obtained by the electrical components 704, 706, 708, 710, 712, etc. While shown as being external to memory 714, it is to be understood that one or more of the electrical components 704, 706, 708, 710, and 712 may exist within memory 714. In one example, electrical components 704, 706, 708, 710, and 712 can include at least one processor, or each electrical component 704, 706, 708, 710, and 712 can be a corresponding module of at least one processor. Moreover, in an additional or alternative example, electrical components 704, 706, 708, 710, and 712 may be a computer program product including a computer readable medium, where each electrical component 704, 706, 708, 710, and 712 may be corresponding code.

Figure 8:
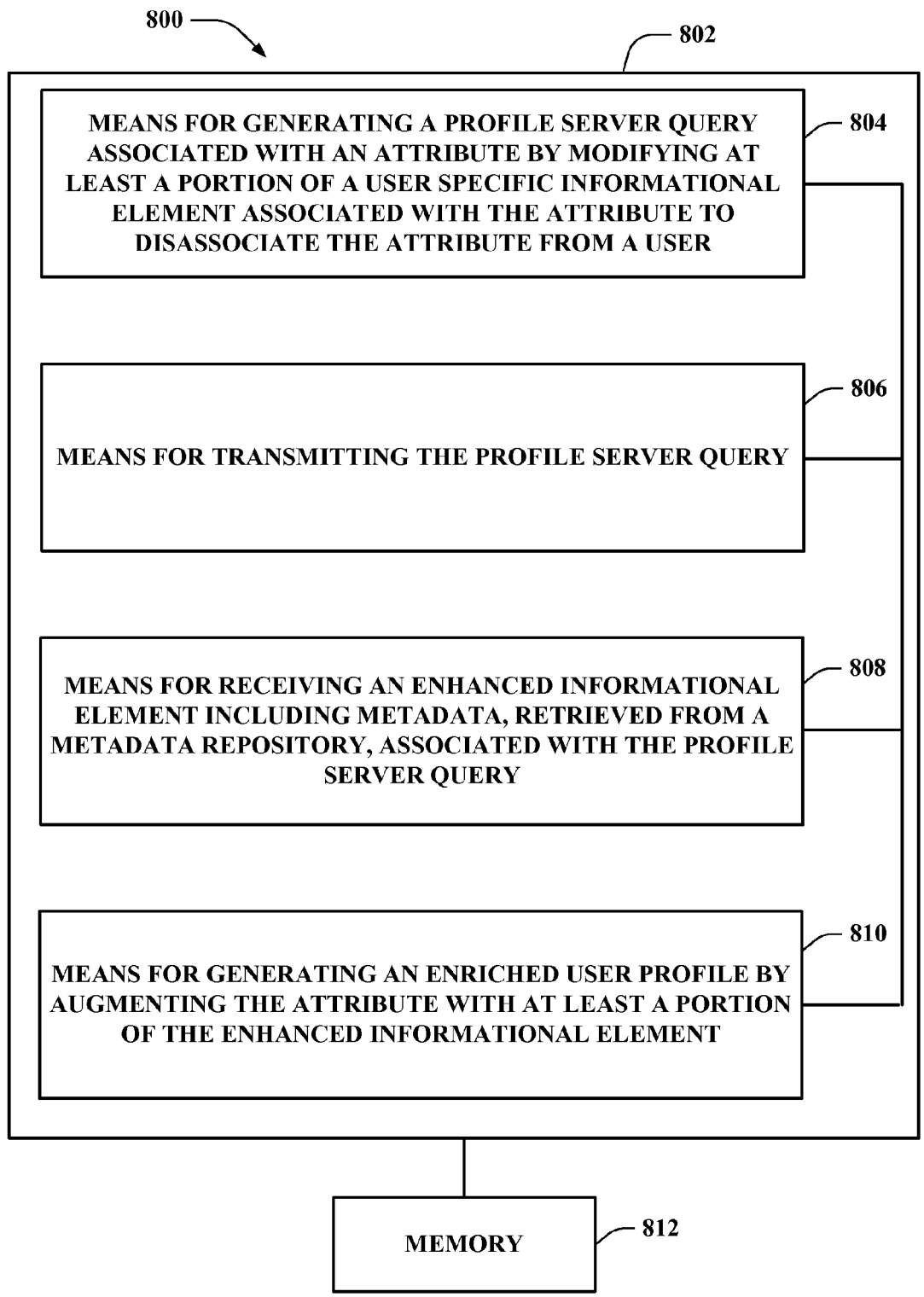
FIG. 8 depicts a block diagram of an exemplary communication system for using an enriched user profile, according to an aspect.

FIG. 8 depicts another block diagram of an exemplary communication system 800 operable to use an enriched user profile, according to an aspect. For example, system 800 can reside at least partially within a communications device (e.g., communications device 500). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component that may provide means for generating a profile server query associated with an attribute by modifying at least a portion of a user specific informational element associated with the attribute to disassociate the attribute from a user 804. In an aspect, the electrical component 804 may further be configured for removing at least a portion of a contextual sub-element of the user specific informational element. In such an aspect, the electrical component 804 may further be configured for removing location information, place information, etc., from the contextual sub-element. In one aspect, the user specific informational element may be a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof.

Further, logical grouping 802 can include an electrical component that may provide means for transmitting the profile server query 806. Still further, logical grouping 802 can include an electrical component that may provide means for receiving an enhanced informational element associated with the profile server query including metadata received from a metadata repository 808. Moreover, logical grouping 802 can include an electrical component that may provide means for generating an enriched user profile by augmenting the attribute with at least a portion of the enhanced informational element 810.

Additionally, system 800 can include a memory 812 that retains instructions for executing functions associated with the electrical components 804, 806, 808, and 810, and stores data used or obtained by the electrical components 804, 806, 808, 810, etc. While shown as being external to memory 812, it is to be understood that one or more of the electrical components 804, 806, 808, and 810 may exist within memory 812. In one example, electrical components 804, 806, 808, and 810 can include at least one processor, or each electrical component 804, 806, 808, and 810 can be a corresponding module of at least one processor. Moreover, in an additional or alternative example, electrical components 804, 806, 808, and 810 may be a computer program product including a computer readable medium, where each electrical component 804, 806, 808, and 810 may be corresponding code.

Figure 9:
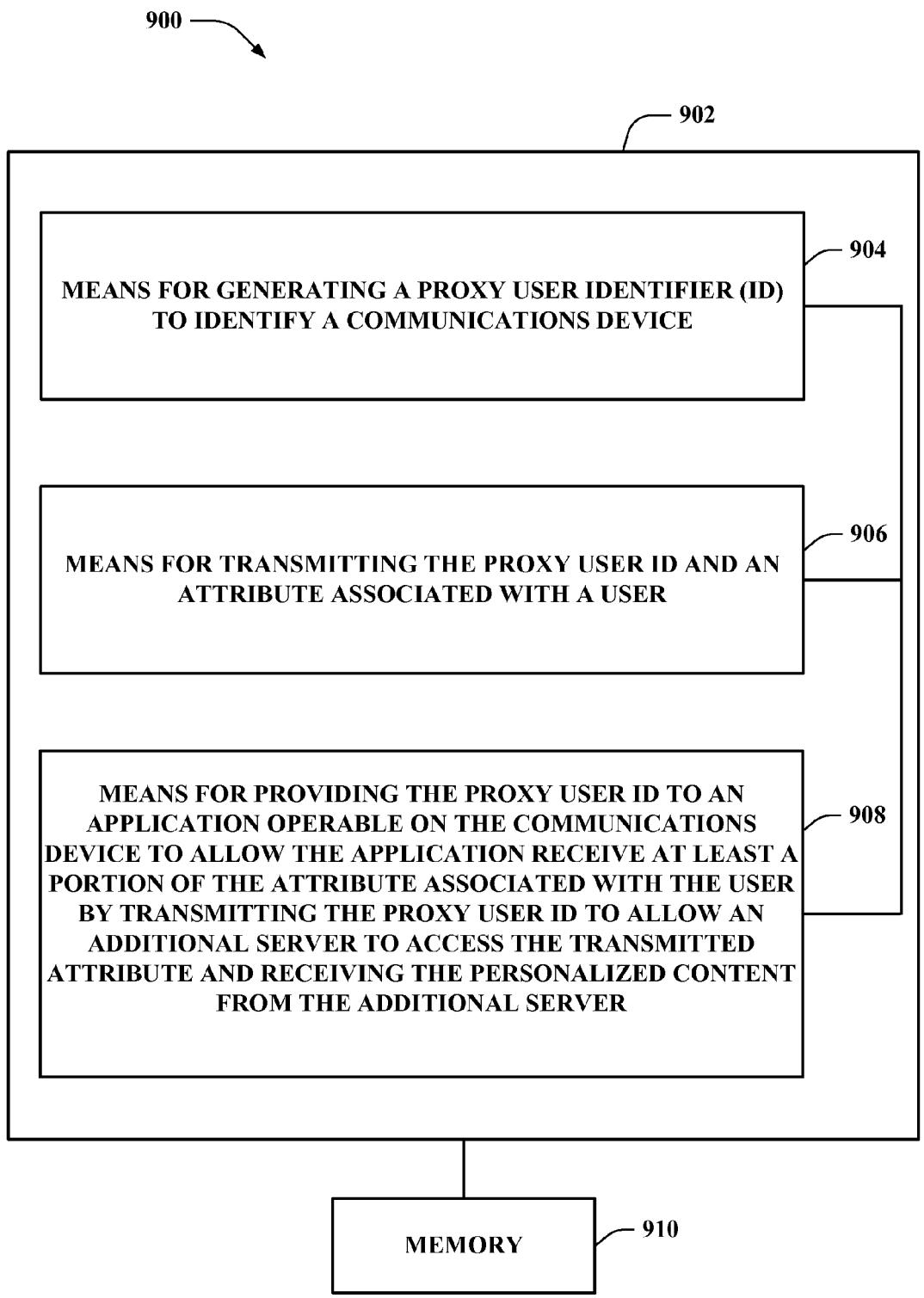
FIG. 9 depicts a block diagram of an exemplary communication system for using an enriched user profile, according to an aspect.

FIG. 9 depicts another depicts a block diagram of an exemplary communication system 900 operable to use an enriched user profile, according to an aspect. For example, system 900 can reside at least partially within a communications device (e.g., communications device 500). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component that may provide means for generating a proxy user ID to identify a communications device 904. In an aspect, the electrical component 904 may further be configured for generating the proxy user ID periodically, generating the proxy user ID valid for a threshold duration of time, generating the proxy user ID valid for a threshold number of used by the application, etc., or any combination thereof. In one an aspect, the attribute associated with the user include a user specific informational element, and the user specific informational element may include a contextual sub-element.

Further, logical grouping 902 can include an electrical component that may provide means for transmitting the proxy user ID and an attribute associated with a user 906. Moreover, logical grouping 902 can include an electrical component that may provide means for providing the proxy user ID to an application operable on the communications device 908. In one aspect, the application may configured to receive personalized content through means for transmitting the proxy user ID to allow an additional server to access the transmitted attribute, and means for receiving the personalized content from the additional server.

Additionally, system 900 can include a memory 910 that retains instructions for executing functions associated with the electrical components 904, 906, and 908, and stores data used or obtained by the electrical components 904, 906, 908, etc. While shown as being external to memory 910, it is to be understood that one or more of the electrical components 904, 906, and 908 may exist within memory 910. In one example, electrical components 904, 906, and 908 can include at least one processor, or each electrical component 904, 906, and 908 can be a corresponding module of at least one processor. Moreover, in an additional or alternative example, electrical components 904, 906, and 908 may be a computer program product including a computer readable medium, where each electrical component 904, 906, and 908 may be corresponding code.

Figure 10:
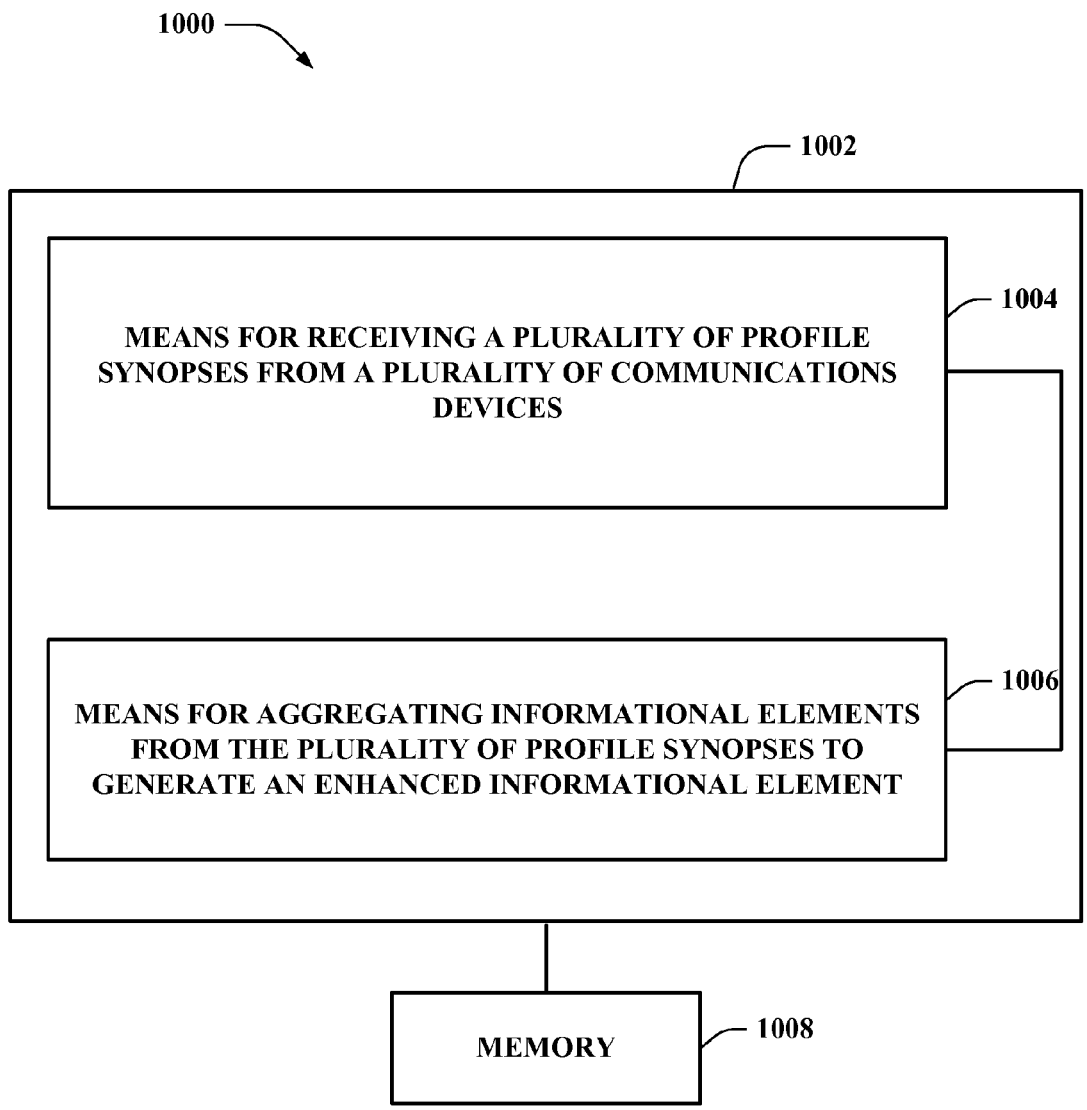
FIG. 10 depicts a block diagram of an exemplary communication system for using an enriched user profile, according to an aspect.

FIG. 10 depicts another block diagram of an exemplary communication system 1000 operable to use an enriched user profile, according to an aspect. For example, system 1000 can reside at least partially within a server (e.g., profile server system 600). It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction.

For instance, logical grouping 1002 can include an electrical component that may provide means for receiving a plurality of profile synopses from a plurality of communications devices 1004. In one aspect, each profile synopsis may include an informational element. In such an aspect, at least one informational element may have been modified to remove at least a portion of user specific information from a user specific informational element available on a corresponding communications device. In an aspect, the electrical component 1004 may further be configured for receiving each profile synopsis from a corresponding communications device once during a profile synopsis aggregation period. In an aspect, the electrical component 1004 may further be configured for receiving a profile server query associated with an attribute. In such an aspect, the logical grouping 1002 can include an electrical component that may provide means for obtaining metadata from a metadata repository based on the received profile server query, and means for transmitting the metadata. The metadata repository can include the enhanced informational element. In an aspect, the electrical component 1004 may further be configured for receiving a proxy user ID and an attribute from a communications device, as well as receiving a request for the attribute including a copy of the proxy user ID from a second server. In such an aspect, the logical grouping 1002 can include an electrical component that may provide means for authenticating the request by comparing the proxy user ID received from the communications device with the copy of the proxy user ID received from the second server, and means for transmitting at least a portion of the attribute to the second server.

Moreover, logical grouping 1002 can include an electrical component that may provide means for aggregating the informational elements from the plurality of profile synopses to generate an enhanced informational element 1006.

In an optional aspect, the logical grouping 1002 can include one or more electrical components that may provide means for transmitting the enhanced informational elements to at least one of the plurality of communications devices to augment the user specific informational element.

Additionally, system 1000 can include a memory 1008 that retains instructions for executing functions associated with the electrical components 1004 and 1006, and stores data used or obtained by the electrical components 1004, 1006, etc. While shown as being external to memory 1008, it is to be understood that one or more of the electrical components 1004 and 1006 may exist within memory 1008. In one example, electrical components 1004 and 1006 can include at least one processor, or each electrical component 1004 and 1006 can be a corresponding module of at least one processor. Moreover, in an additional or alternative example, electrical components 1004 and 1006 may be a computer program product including a computer readable medium, where each electrical component 1004 and 1006 may be corresponding code.

Figure 11:
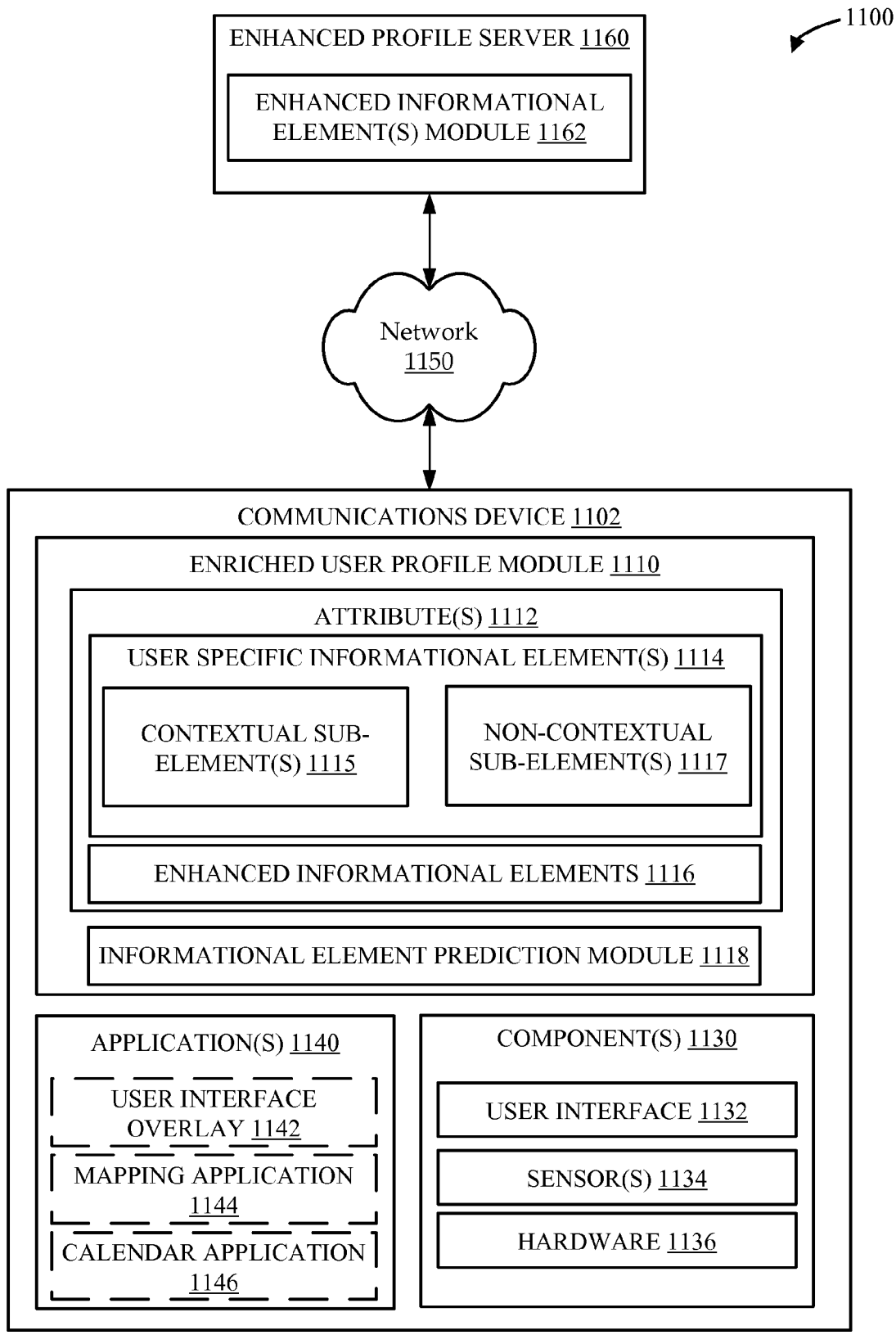
FIG. 11 depicts a block diagram of a communications system in which an enriched user profile is used, according to an aspect.

FIG. 11 illustrates a block diagram of a system 1100 in which an enriched user profile is operable. System 1100 may include a communications device 1102 (e.g., terminal, client, UE), which can communicate with other communications device and/or one or more servers, such as enhanced profile server 1160, via network 1150. In one aspect, communications device 1102 may be operable to communicate using wireless protocols, such as, but not limited to, LTE, CDMA, TDMA, FDMA, OFDMA, SC-FDMA, TD-SCDMA, Global System for Mobile Communications (GSM), Universal Terrestrial Radio Access (UTRA), Evolved UTRA (E-UTRA), etc. In another aspect, communications device 1102 may be operable to communicate using wired communications such as systems based on coaxial cable, fiber optic cable, twisted pair, digital subscriber line (DSL), etc.

Communications device 1102 may include enriched user profile module 1110, one or more components 1130, and one or more applications 1140 (e.g., third party applications, etc.). Enriched user profile module 1110 may provide the ability to infer and/or predict types of user need and/or behaviour, in order to personalize the user's experience with the communications device 1102 and/or to optimize device performance with respect to the user's interaction with the communications device 1102. In one aspect, enriched user profile module 1110 may include one or more attributes 1112 that may be supplemented with and/or augmented by enhanced informational elements 1116 obtained from the profile server 1160 and enhanced informational element module 1162. Each of the one or more attributes 1112 may include one or more user specific informational elements 1114. In one aspect, each of the user specific informational elements 1114 may include one or more contextual sub-elements 1115 and/or one or more non-contextual sub-elements 1117.

An attribute 1112 may include, but is not limited to one or more user interests and/or characteristics. In one aspect, an interest and/or characteristic may be stored as user specific informational element 1114. Further, an attribute 1112 may include relevance information (e.g., a percentage likelihood of how interested a user is in the user specific informational element) and/or probability information (e.g., a percentage likelihood that an obtained user specific informational element is accurate).

Further, a user specific informational element 1114 may include an informational element that provides insight into one or more attributes associated with the user. Examples of a user specific informational element include, but are not limited to, a user interest, place information, location information, communications device sensor 1134 derived data, communications device hardware 1136 derived data, a user characteristic, user demographics information, a browser history, application usage history, a call history, communications device background activity, traffic utilization data, a communications device charge level, a communications device charge state, user input, etc., or any combination thereof. The user specific informational element may be obtained through device inference (e.g., derived by a device component based on a user behavior), user input, server provided information, etc., or any combination thereof.

A contextual sub-element 1115 may include a number of items associated with a user. By way of example and not limitation, a contextual sub-element may include one or any combination of, a location associated with a user, a time of day, a day of the week, an activity associated with the user, a level of user interaction with the communications device 1102, a user's recent interaction with the communications device 1102, an available resource (e.g., battery current, memory, processing capabilities, etc.) associated with the communications device 1102, a sensor 1134 output (e.g., movement, indoors/outdoors from light sensors, etc.) associated with the communications device 1102, a battery life value associated with the communications device 1102, news relevant to the user, an item scheduled in a calendar application, a tasks application, a notes application, a contacts application, etc., weather information, traffic information, a proximity value of the communications device 1102 to another device, a proximity value of the communications device 1102 to one or more other users, server derived content, availability of one or more data bearers (e.g., 3 G/4 G, Wi-Fi), a power usage value (e.g., when device is docked/plugged/charging), camera usage, site browsing history, purchasing patterns, etc.

Further, a non-contextual sub-element 1117 may include, but is not limited to, one or any combination of, a user's gender, the user's age, another device associated with the user, the user's media interest, the user's financial information, the user's game interest, an association with a second user, the user's profession, etc.

Component 1130 may include user interface 1132, one or more sensors 1134, and/or one or more hardware components 1136. In one aspect, a component 1130 may operate in conjunction with one or more external components. In one aspect, the external component may include a user interface, a sensor, a hardware component, a docking station, a cradle, a charging station, etc. In one aspect, user interface 1132 may include various features, such as a display, user input and output mechanisms, etc. In one aspect, the one or more sensors 1134 may include, but are not limited to, an accelerometer, a gyroscope, a proximity sensor, a light sensor, etc. In another aspect, sensors 1134 may further refer to any sensor with which communications device 1102 is operable to interact (e.g., breathalyzer, wind gauge, thermometer, barometer, altimeter, pedometer, heart rate monitor, blood pressure monitor, blood sugar monitor, etc.). In one aspect, a hardware component 1136 may include, but is not limited to, one or more antennas, a battery, a GPS monitoring module, etc.

Enriched user profile module 1110 may support generating/maintaining/modifying and/or updating an enriched user profile. Further, enriched user profile module 1110 may include informational element prediction module 1118 that may assist enriched user profile module 1110 in predicting occurrence of one or more events. In one aspect, informational element prediction module 1118 may predict an event, may determine one or more components 1130 that may be affected by the predicted event, and may modify a functionality associated with the component based on the predicted event. For example, informational element prediction module 1118 may predict that one or more components 1130 may not be used for a duration of time and may modify and/or cease one or more functionalities associated with the component 1130 based on the predicted non-use. In such an operational aspect, overall communications device 1102 power usage may be improved. Further, in such an operational aspect, by reducing interactions with the one or more components 1130, the life expectancy of the component 1130 and/or communications device 1102 may be increased.

Application 1140 may assist communications device to perform specific tasks. In an optional aspect, application 1140 may provide an enhanced user experience through interaction with an enriched user profile module 1110. In one aspect, application 1140 may include an optional application that provides a user interface overlay 1142 for the user interface 1132 of communication device 1102. In such an optional aspect, user interface overlay application 1142 may obtain an informational element from informational element prediction module 1118 and may provide the informational element as a suggested overlay for the user interface 1132. For example, a suggested overlay may include contact information for a peer predicted to be of interest, an icon for an application 1140 predicted to be of use, a suggested content item with which a user is predict to interact, etc. In another aspect, application 1140 may include an optional mapping application 1144. In such an optional aspect, mapping application 1144 may obtain an informational element from informational element prediction module 1118 provide one or more suggested overlays, suggested entries, etc. For example, optional mapping application 1144 may obtain one or more suggested locations of interest at a present time, a predicted future time, at a current location, a predicted future location, etc., and may present the obtained informational element as a suggested overlay, suggested entry, etc., on a map displayed on the user interface 1132. In another aspect, application 1140 may include an optional calendar application 1146. In such an optional aspect, calendar application 1146 may obtain an informational element from informational element prediction module 1118 to provide one or more suggested overlays, suggested entries, etc. For example, optional calendar application 1146 may obtain one or more suggested locations of interest at a present time, a predicted future time, at a current location, a predicted future location, etc., and may present the obtained informational element as a suggested overlay, suggested entry, etc., on a calendar displayed on the user interface 1132. In an aspect used herein, a suggested overlay and/or a suggested entry can include information that may be presented to a user as an optional item that a user is not requested to perform, accept, and/or add. In one aspect, a suggested overlay and/or a suggested entry may include an option that allows a user to accept and/or reject the suggestion.

Figure 12:
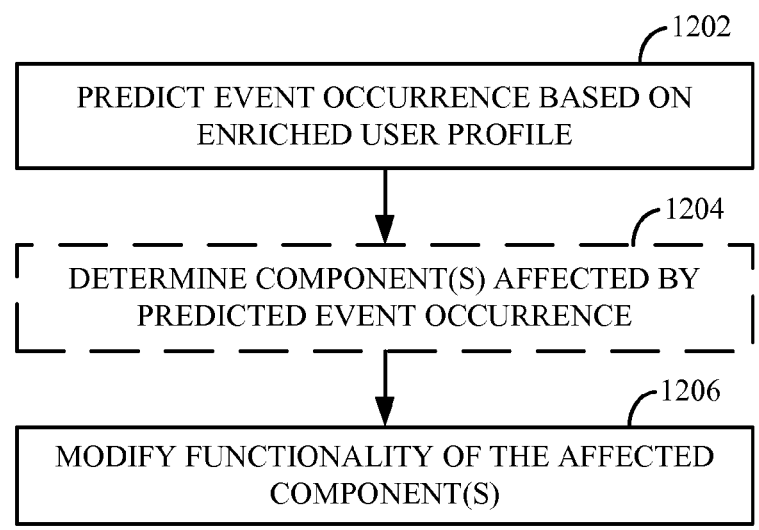
FIG. 12 depicts a flowchart describing an example system for predicting future event occurrence and modifying device functionality according to an aspect.

FIG. 12 illustrates an example flowchart process 1200 performed by a communications device to utilize an enriched user profile to modify the functionality of one or more components associated with the UE. As used herein, a component may include any one or combination of, a hardware component such as a battery, modem interfaces (e.g., cellular, WiFi, etc.), user interface, etc., or a software component such as an application, data, content, etc.

At block 1202, the communications device may interpret the enriched profile to predict occurrence of an event that may affect functionality of one or more components associated with the communications device. For example, the communications device may interpret the enriched profile to predict when the user will be within range of various radio bearers with differing bandwidth capabilities. In another example, the communications device may interpret the enriched profile to predict when the communications device is near a recharger. In another example, the communications device may interpret the enriched profile to predict occurrence of various activities by the user (running, sitting in a meeting, out for dinner at a restaurant, etc.). In still another example, the communications device may interpret the enriched profile to use any feature or application running on the device.

In an optional aspect, at block 1204, the communications device may determine one or more components that may be affected by the predicted occurrence. In another aspect, communications device may include one or more predefined links between a predicted event occurrence and a component that may be affected. In such an aspect, the communications device may not determine a component affected by a predicted event, and instead may notify one or more components that are linked to the event occurrence. For example, where a communications device predicts that a radio bearer with improved performance will be available at a first time, and the communications device may have previously linked improved radio bearer usage and use of an application, then the communications device may notify the previously linked application.

At block 1206, the communications device may modify a functionality associated with the one or more affected components. For example, if the communications device predicts a bearer with different capabilities (e.g., such as data speed, quality of service, level of encryption, etc.) will be available in the near future, then an application on the communications device may hold off on downloading content until the predicted time. In another example, if the communications device predicts no bearer with greater bandwidth will be available in the near future, an application on the device may limit available options and/or display with content with a reduced image quality. In another example, if the communications device predicts the communications device battery life will fall below a certain threshold before a time during which the communications device may be charged, then the communications device may reduce various available functions so as to conserve battery life.

Figure 13:
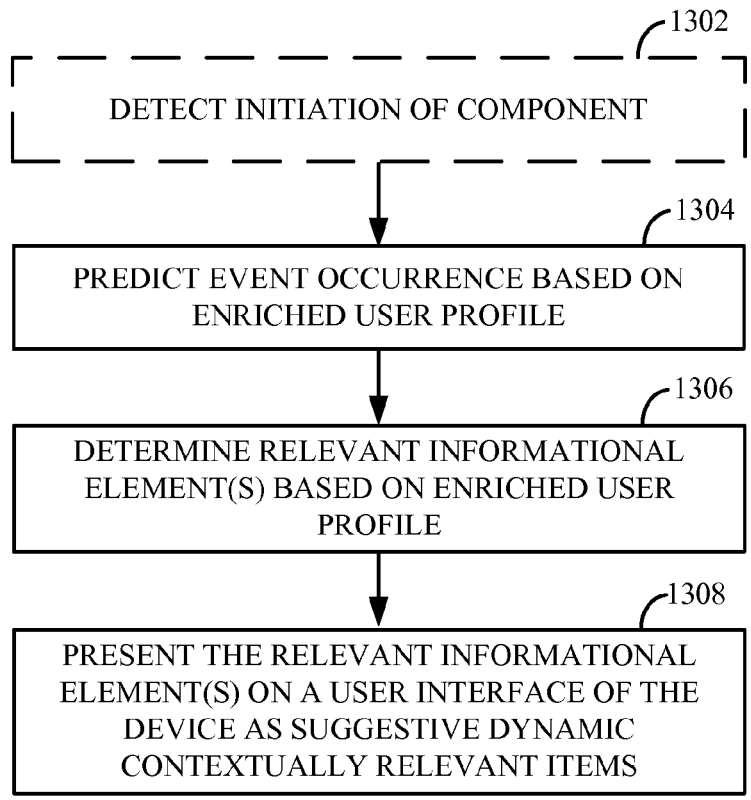
FIG. 13 depicts another flowchart describing an example system for using an enriched user profile to predict future event occurrences, according to an aspect.

FIG. 13 illustrates an example flowchart process 1300 performed by a communications device to utilize an enriched user profile and contextual information to present contextually relevant content to a user interface in a dynamic and/or suggestive manner.

In an optional aspect, at block 1302, a communications device may detect that a component, such as but not limited to, a user interface has been initiated. In one aspect, the communications device may detect the initiation from a user device powering up, the user device waking up from a sleep (e.g., idle) mode, the user device transitioning from a lock screen to a general home screen. In one aspect, the user interface can include a lock screen, a home screen, etc.

At block 1304, the communications device may interpret the enriched profile to predict occurrence of an event that may affect functionality of the initiated component associated with the communications device.

At block 1306, the communications device may determine one or more relevant informational elements based on at least in part on an enriched user profile and contextual information. The enriched user profile may include one or more user specific informational elements and one or more enhanced informational elements. In one aspect, such informational elements may include, but are not limited to, user initiated events/activities (e.g., applications/site usage, etc.), user locations (e.g., places), communications device stored data (e.g., media, various configurations, etc.), hardware sensor data, user inputs, etc. The one or more enhanced informational elements may be associated with the one or more user specific elements and may include content that was obtained from the profile server. For example, the enhanced informational elements may be derived from server assisted event analysis (e.g., group behavior and/or interests based on aggregation of multiple profile synopses).

At block 1308, the communications device may present the determined one or more relevant informational elements on the user interface. In one aspect, the presenting may include presenting the one or more relevant informational elements in a dynamic contextually relevant suggestive manner. For example, comparative relevance to the user of the relevant informational elements may be determined and comparatively more relevant elements may be displayed in a comparatively more prominent manner. In such an example, prominence may be depicted in any number of ways, such as through use of different fonts, font sizes, font colors, display location, display duration, different graphical icon, flashing text, flashing graphic, vibrating the device, etc. The relevant informational elements may be displayed in a suggestive (e.g., unobtrusive) manner. For example, the relevant informational elements may be represented at the user interface so as to avoid being obtrusive with the user selected applications, content etc.

Figure 14:
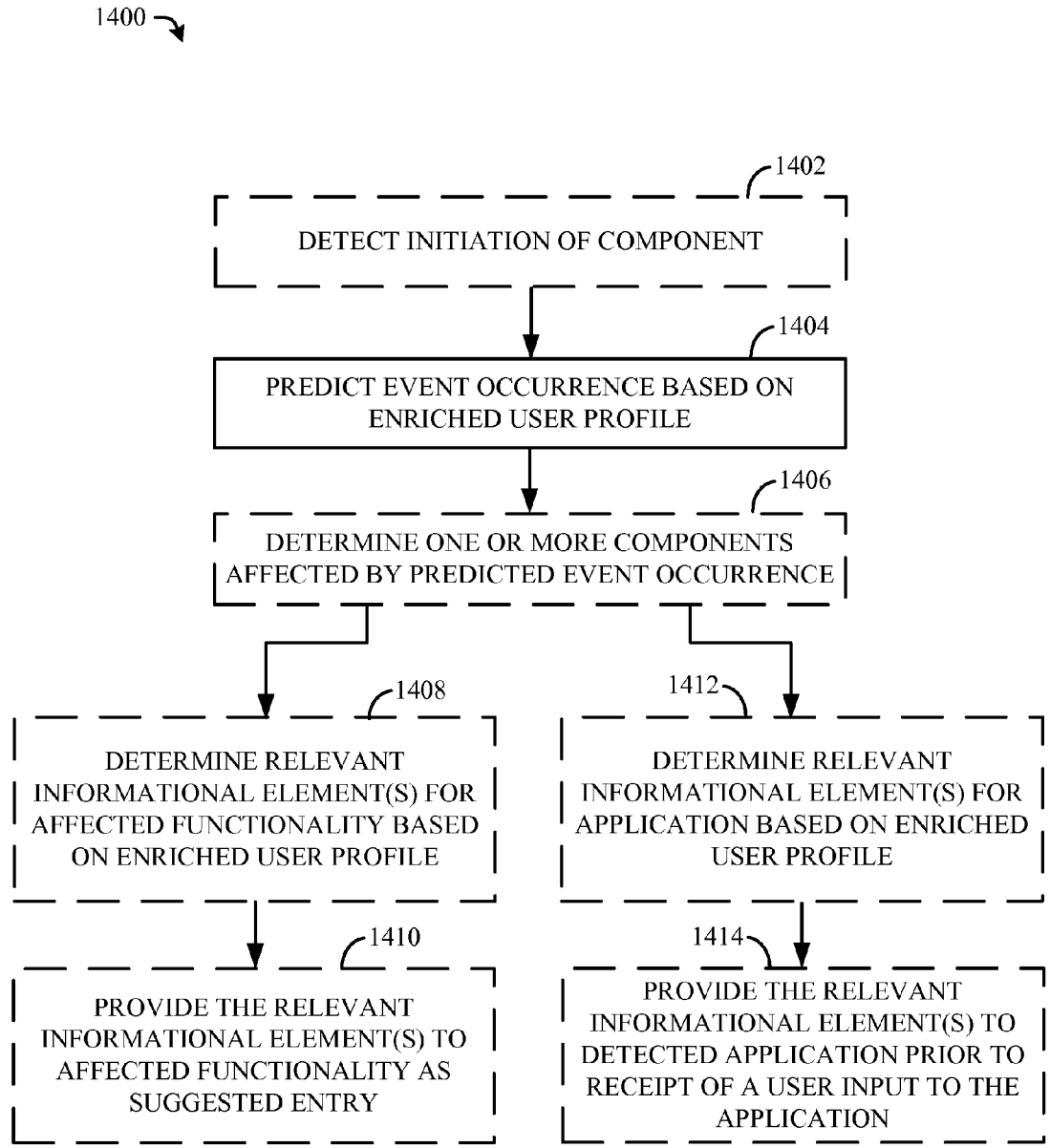
FIG. 14 depicts another flowchart describing an example system for using an enriched user profile to predict future event occurrences, according to an aspect.

FIG. 14 illustrates an example flowchart process 1400 performed by a communications device to utilize an enriched user profile and contextual information.

In an optional aspect, at block 1402, a communications device may detect that a component, such as but not limited to, a user interface has been initiated. In one aspect, the communications device may detect the initiation from a user device powering up, the user device waking up from a sleep (e.g., idle) mode, the user device transitioning from a lock screen to a general home screen. In one aspect, the user interface can include a lock screen, a home screen, etc.

At block 1404, the communications device may interpret the enriched profile to predict occurrence of an event that may affect functionality of the initiated component associated with the communications device.

As noted above, in an optional aspect, at block 1406, the communications device may determine one or more components that may be affected by the predicted occurrence.

In an optional aspect, at block 1410, the communications device may determine one or more relevant informational elements for the affected component based on an enriched user profile. In one aspect, the relevancy of the one or more relevant informational elements may be determined based on the content of the enriched user profile and one or more features available through the detected functionality. In one aspect, the one or more relevant informational elements may include predicted events that may be determined based on the analysis of the enriched user profile and one or more features associated with the functionality. For example, where the functionality is a mapping application, the predicted events may include one or more points of interest at a location displayed by the mapping application at one or more future times. Further, a location displayed by the mapping application may be varied based on one or more predicted future locations for the one or more future times. In another example, wherein the functionality is a calendar application, the predicted events may be tentative entries to the user calendar.

At optional block 1410, the communications device may provide the relevant informational elements to the functionality as suggested entries. In one aspect, the elements may be provided in a format that allows the functionality to present the one or more contextually relevant suggested entries as an overlay. For example, where the functionality is a mapping application, the relevant informational elements may be displayed as one or more points of interest at a location displayed by the mapping application. The user may be provided with an option to look at future times and suggested events associated with those future times. Further, the user may be given an option to look at a predicted location associated with each of the future times and suggested events at those locations at those times. In another example, where the functionality is a calendar application, the relevant informational elements may be displayed as one or more tentative entries. The application may use nested lens to display different portions of the relevant informational elements. This allows custom information to be viewed for various calendar levels (daily, monthly, future). The relevant informational elements may be subdivided into various categories, such as but not limited to entertainment, product releases, sale events, etc. Further, elements associated with the calendar, including the relevant informational elements, may be shared with peers. As noted above, relevance may be determined through analysis of the enriched user profile. As such, events, event genres, etc. that show a strong (e.g., consistent) pattern may be surfaced at the user interface and may be indicated as being relevant to the user. Such relevant events may be presented to the home screen and/or provided to applications.

In another optional aspect, at block 1412, the communications device may determine one or more relevant informational elements for the initiated component based on at least in part on an enriched user profile and contextual information. In such an optional aspect, the component may be an application, a hardware component, a sensor, etc. For example, where the component is an application and where the application is an internet searching application, the predicted inputs may be one or more search terms based on prior search inputs, the user location, the user interests, the time of day, other open applications, etc. In another example, where the component is an application and where the application is a mapping application, the predicted input may include one or more points of interest at the current location, directions to the user's home, etc. In another example, where the component is an application and where the application is a calendar application, the predicted input may be tentative entries to the user calendar.

At optional block 1414, the communications device may provide the relevant informational elements to the component prior to receipt of a user interaction with the component. In one aspect, the elements may be provided in a format that allows the application to present the one or more contextually relevant suggested entries as an overlay, list, grid, queue, stack, carousel, etc. In one aspect, a suggested entry may be provided auditorily, visually, tactically, etc. For example, where the component is an internet searching application, the relevant informational elements may be one or more search term/phrase suggestions provided as a list below the search input box. In another example, where the component is a mapping application, the relevant informational elements may be displayed as one or more points of interest at a location displayed by the mapping application. The user may also be provided with an option to look at future times and suggested events associated with those future times. Further, the user may be given an option to look at a predicted location associated with each of the future times and suggested events at those locations at those times. In another example, where the component is a calendar application, the relevant informational elements may be displayed as one or more tentative entries. The application may use nested lens to display different portions of the relevant informational elements. This allows custom information to be viewed for various calendar levels (daily, monthly, future).

Figure 15:
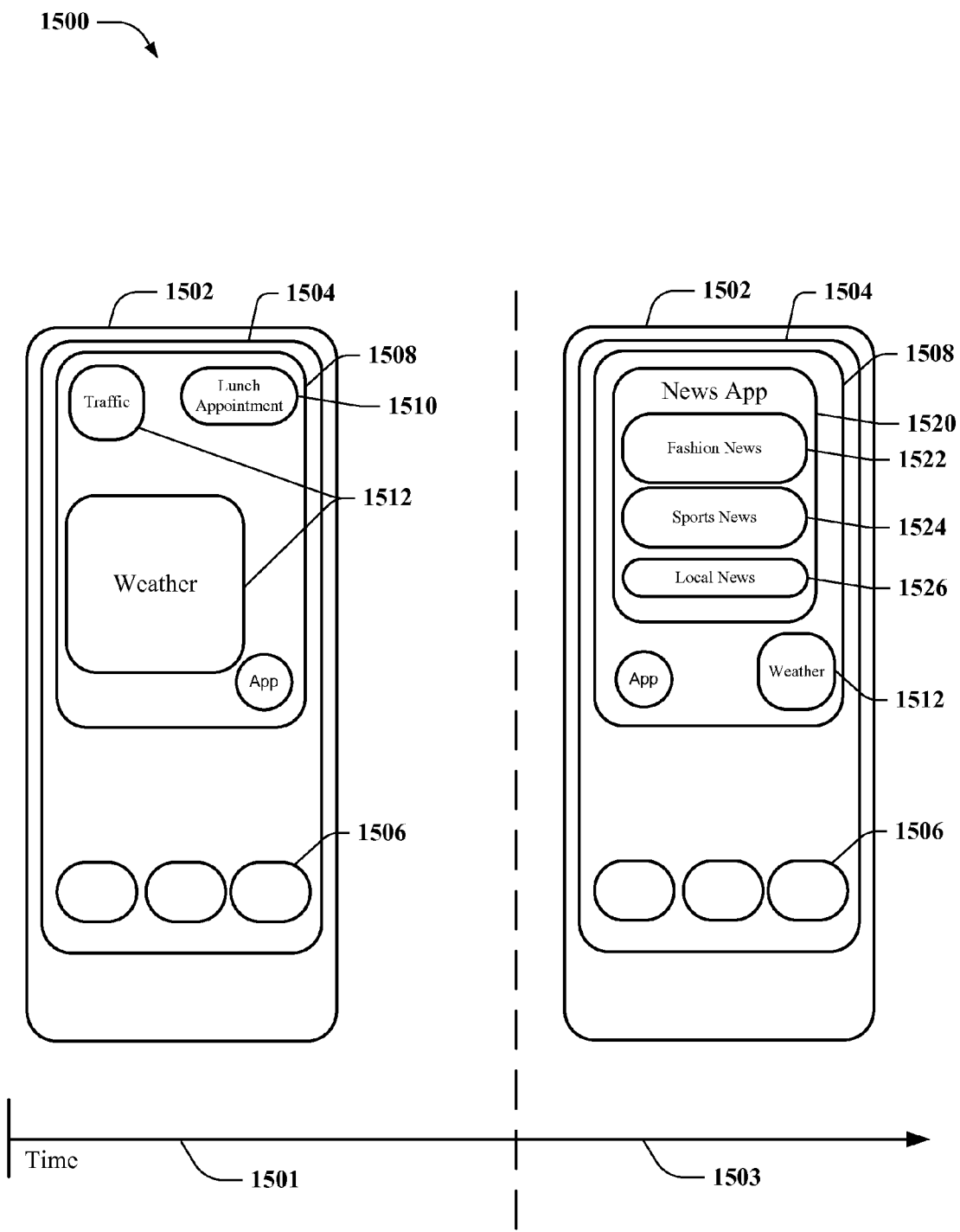
FIG. 15 depicts an example set of user interface displays depicting implementation of features associated with an enriched user profile, according to an aspect.

FIG. 15 illustrates an example communications environment 1500 at multiple times (1501, 1503) in which a communications device 1502 is operable to use an enriched user profile to provide contextually relevance information to a user in a dynamic manner. Communications device 1502 may include a user interface 1504. In one aspect, the user interface may include one or more applications 1506 and/or a dynamically changeable portion 1508 of the user interface 1504 that may present one or more content items (e.g., 1510, 1512) in a suggestive relevant manner.

At a first time 1501, the communications device 1502 may be locked with an active lock screen displayed on the user interface 1504. In operation, the communications device 1502 may use the enriched user profile and contextual information to determine the one or more interests and/or intents of this user. For example, at first time 1501, user interface 1504 may include a dynamically changeable display portion 1508 that is operable to display different informational elements in different manners at least partially based on a predicted relevance to the user. For example, at first time 1501, the communications device 1502 may predict information associated with the start of a work day 1512 (e.g., weather, traffic) being of greater relevance than information associated with an activity scheduled for later in the day 1510.

At a later time 1503, the lock screen display may be shifted to emphasis a different content item 1520. Further, different emphasized content items 1520 may include one or more further emphasized sub-aspects (1522, 1524, 1526). In one aspect, the display of content items may be distinguished based on use of different fonts, different font sizes, different font colors, different graphical icons, flashing text, flashing graphics, tactile feedback (e.g., device vibration), positioning the contextually relevant informational element in a comparatively more prominent location of the user interface, etc., or any combination thereof.

In an operational aspect, at time 1501, a "Daily Planner" mode shows the weather 1512 prominently (including a secondary location that is visited most weekdays), the user's next calendar event 1510 less prominently, and a traffic widget 1512 that estimates commute time (using known route provided by a traffic application). Further, shortcuts that have been determined to be relevant may be dynamically defined, and based on interest and usage, populated with relevant content. Throughout the morning leading up to noon, the user may check news apps and websites related to a specific topic (e.g., sports, fashion, etc.). Somewhat less frequently, the user may read up on local news. The user may also send SMS and email messages to friends and co-workers asking about lunch plans as noon approaches. In addition, a few times a week, the user makes calls during a lunch break to a different town. This information may be stored and aggregated to allow the device 1502 to provide relevant content for display on the user interface 1504.

Continuing the above example, at the later time 1503, the lock screen may shift to "news feed" mode based on the strong interest in news 1520. Fashion news 1522 and/or sports news 1524 may dominate, followed by local news 1526. In one aspect, although news about a different city to which the user has placed calls is not directly indicated, a major storm approaching that city may make news about that city more relevant to the user and stories related to that city may "bubble up" towards the top of news feeds among various news feeds the from which content displayed on the lock screen can be drawn. As such, news about the different city may be displayed on the lock screen (e.g., made more prominent) in case the user wants to call and check on his/her friends.

Figure 16:
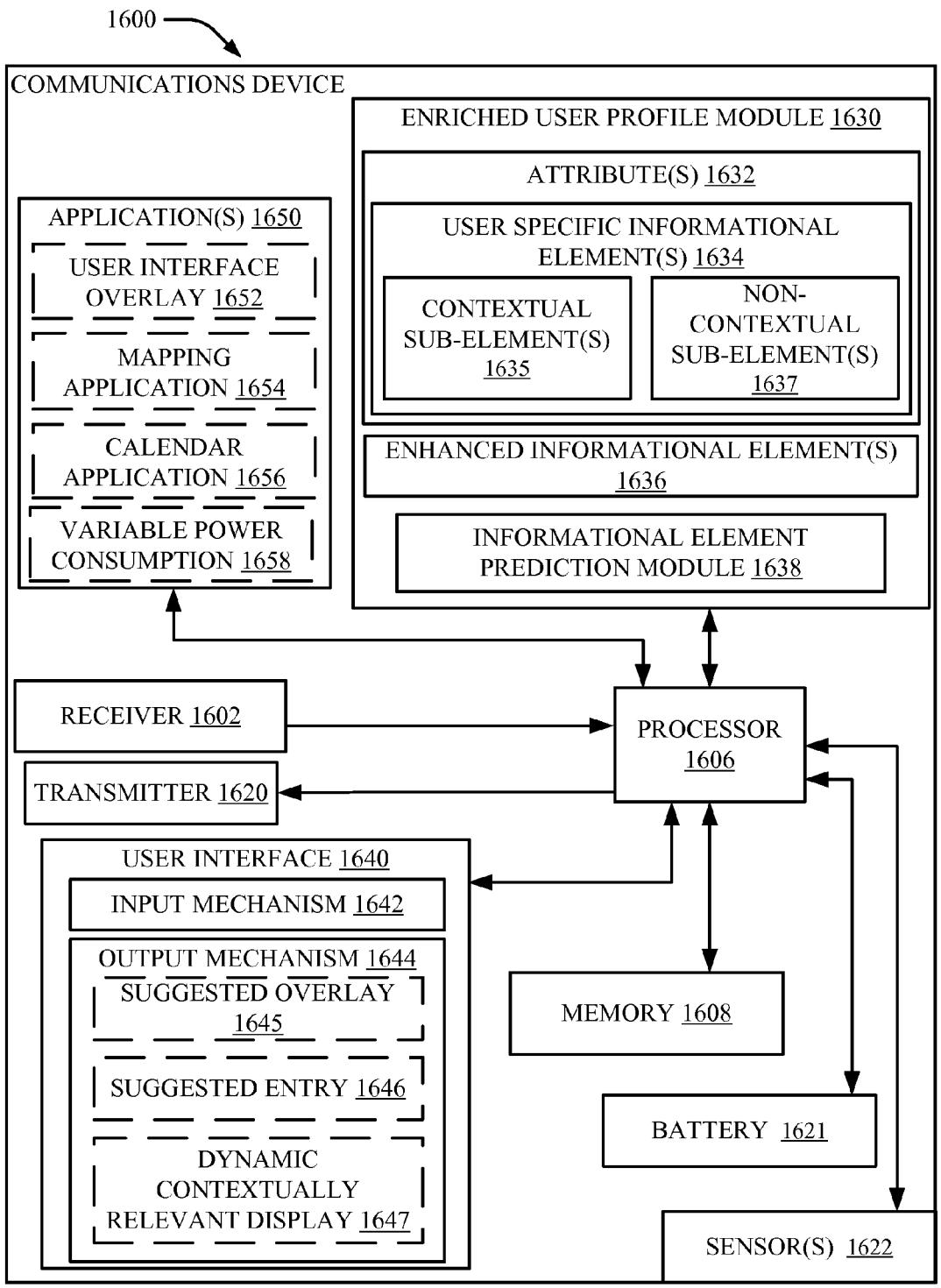
FIG. 16 depicts a block diagram of an example communications device for providing for an enhanced user experience through use of an enriched user profile according to an aspect.

FIG. 16 depicts a block diagram of an example communications device 1600 for providing an enhanced user experience through use of an enriched user profile, according to an aspect. Communications device 1600 comprises receiver 1602 that receives one or more signals from, for instance, one or more receive antennas (not shown), performs typical actions on (e.g., filters, amplifies, downconverts, etc.) the received signals, and digitizes the conditioned signals to obtain samples. Receiver 1602 can further comprise an oscillator that can provide a carrier frequency for demodulation of the received signals and a demodulator that can demodulate received symbols and provide them to processor 1606 for channel estimation. In one aspect, communications device 1600 may further comprise one or more secondary receivers and may receive additional channels of information.

Processor 1606 can be a processor dedicated to analyzing information received by receiver 1602 and/or generating information for transmission by one or more transmitters 1620 (for ease of illustration, one transmitter is shown), a processor that controls one or more components of communications device 1600, and/or a processor that analyzes information received by receiver 1602, generates information for transmission by transmitter 1620 for transmission on one or more transmitting antennas (not shown), and controls one or more components of communications device 1600.

In one aspect, processor 1606 and/or enriched user profile module 1630 may provide means for predicting an event occurrence by interpreting an enriched user profile including an attribute and an enhanced informational element, and means for modifying a functionality of a component of a communications device based on the predicted event occurrence.

Communications device 1600 can additionally comprise memory 1608 that is operatively coupled to processor 1606 and that can store data to be transmitted, received data, information related to available channels, data associated with analyzed signal and/or interference strength, information related to an assigned channel, power, rate, or the like, and any other suitable information for estimating a channel and communicating via the channel. Memory 1608 can additionally store protocols and/or algorithms associated with estimating and/or utilizing a channel (e.g., performance based, capacity based, etc.). In one aspect, memory 1608 may include a UICC, which may include various modules such as but not limited to, a subscriber information module (SIM), a CDMA Subscriber Identity Module (CSIM), etc.

It will be appreciated that the data store (e.g., memory 1608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1608 of the subject systems and methods is intended to comprise, without being limited to, these and any other suitable types of memory.

Communications device 1600 may include enriched user profile module 1630, one or more components such as battery 1621, one or more sensors 1622, and one or more applications 1650. Enriched user profile module 1630 may support generating/maintaining/modifying and/or updating an enriched user profile. Enriched user profile module 1630 may include one or more attributes 1632 associated with a user. Each attribute may include one or more user specific informational elements 1634 and each user specific informational element may include a contextual sub-element 1635 and/or a non-contextual sub-element 1637. In one aspect, user specific informational elements 1634 may be supplemented with an enhanced informational element 1636 obtained from a profile server. Further, enriched user profile module 1630 may include informational element prediction module 1638 that may assist enriched user profile module 1630 in predicting occurrence of one or more events.

Informational element prediction module 1638 may be operable to predict occurrence of an event based on analysis of the enriched user profile. In one aspect, the enriched user profile may include information associated with application 1650 availability, usage, etc., and informational element prediction module 1638 may predict one or more future uses of a currently available application 1650, an application 1650 that a user may find of interest, etc. In another aspect, the enriched user profile may include one or more contextual sub-elements 1635 indicating contextual information such as a user's current location and/or one or more activities in which a user is engaged and/or was recently engaged, and informational element prediction module 1638 may predict one or more future events, content items, etc. In one aspect, informational element prediction module 1638 may predict an event and may determine one or more components (e.g., 1608, 1621, 1622, 1650, 1640) that may be affected by the predicted event and may modify a functionality associated with the component based on the predicted event.

In one aspect, the functionality modification may include, but is not limited to, modifying timing associated with activation of a sleep mode, screen dimming, a screen shutoff, etc., or any combination thereof. In one aspect, the functionality modification may include, but is not limited to, modifying functionality of an application 1650 operating in a background mode. In one aspect, informational element prediction module 1638 may analyze the enriched user profile to predict availability of a radio bearer. In such an aspect, enriched user profile module 1630 may use the predicted radio bearer information to modify access timing associated with obtaining one or more content items for the communications device 1600. In another aspect, informational element prediction module 1638 may analyze the enriched user profile to predict availability of a charging source, active usage of the communications device 1600, etc. In an operational aspect, informational element prediction module 1638 may detect a modification to an attribute 1632 within a threshold period of time (e.g., within the most recent minute, five minutes, hour, etc.). Further, informational element prediction module 1638 may analyze the enriched user profile to determine a pattern associated with the detected modification. For example, the pattern may include contextual sub-element 1635 information available contemporaneously with the detected component modification. Thereafter, informational element prediction module 1638 may analyze the enriched user profile to locate a similar pattern among one or more previously stored attributes 1632, user specific informational elements 1634, enhanced informational elements 1636, etc., or any combination thereof. Further, informational element prediction module 1638 may determine an event associated with the similar pattern, and may provide the event as a predicted future event. In one or more aspects, operation of informational element prediction module 1638 may be depicted as provided in the flowcharts of FIG. 12-14.

Application 1650 may assist communications device perform specific tasks. In an optional aspect, application 1650 may provide an enhanced user experience through interaction with an enriched user profile module 1630. In one aspect, application 1650 may include an optional application that provides a user interface overlay 1652 for communications device 1600 user interface 1640. In such an optional aspect, user interface overlay application 1652 which may obtain an informational element from informational element prediction module 1638 may provide the informational element as a suggested overlay 1645 on an output mechanism 1644 of the user interface 1640. For example, a suggested overlay 1645 may include contact information for a peer predicted to be of interest, an icon for an application 1650, a suggested content item with which to interact, etc. In another aspect, application 1650 may include an optional mapping application 1654. In such an optional aspect, mapping application 1654 may obtain an informational element from informational element prediction module 1638 to provide one or more suggested overlays 1645, suggested entries 1646, etc. For example, optional mapping application 1654 may obtain one or more suggested locations of interest at a present time, a predicted future time, at a current location, a predicted future location, etc., and may present the obtained informational element as a suggested overlay 1645, suggested entry 1646, etc., on a map displayed on the output mechanism 1644. In another aspect, application 1650 may include an optional calendar application 1656. In such an optional aspect, calendar application 1656 may obtain an informational element from informational element prediction module 1638 to provide one or more suggested overlays 1645, suggested entries 1646, etc. For example, optional calendar application 1656 may obtain one or more suggested locations of interest at a present time, a predicted future time, at a current location, a predicted future location, etc., and may present the obtained informational element as a suggested overlay 1645, suggested entry 1646, etc., on a calendar displayed on the output mechanism 1644. In one aspect, a suggested overlay 1645 and/or a suggested entry 1646 may include an option that allows a user to accept and/or reject the suggestion. In another aspect, application 1650 may include an optional variable power consumption application 1658. In such an optional aspect, variable power consumption application 1658 may obtain an informational element from informational element prediction module 1638 that may indicate a predicted power consumption state for the communications device 1600. In one aspect, the power consumption state may be a charging state, a docked state, a low battery state, etc. Further, variable power consumption application 1658 may use one or more predicted power consumption states to optimize performance of the communications device 1600 over a usage duration (e.g., a day, a time between charging, etc.).

Additionally, communications device 1600 may include user interface 1640. User interface 1640 may include input mechanisms 1642 for generating inputs into communications device 1600, and output mechanism 1644 for generating information for consumption by the user of communications device 1600. For example, input mechanism 1642 may include a mechanism such as a key or keyboard, a mouse, a touch-screen display, a microphone, etc. In one aspect in which the input mechanism 1642 includes a keyboard (e.g., keys, virtual keyboard, etc.), the keyboard may include functionality associated with various languages based on various alphabets, pictographs, etc. Further, for example, output mechanism 1644 may include a display, an audio speaker, a haptic feedback mechanism, a Personal Area Network (PAN) transceiver etc. In one aspect, output mechanism 1644 may include a display operable to present content that is in image or video format or an audio speaker to present content that is in an audio format. In one aspect, output mechanism 1644 may provide a variable tactile display that may be operable to display different textures, shapes, etc. In such an aspect, the output mechanism 1644 may display Braille text. In one aspect, enriched user profile module 1630 may provide contextually relevant content as a suggested overlay 1645, a suggested entry 1646, etc., to output mechanism 1644. Enriched user profile module 1630 may be used to provide an overlay/entry to an application 1650 running on the communications device 1600 and thereby provide contextually relevant content to the user during use of the application 1650. In an optional aspect, the enriched user profile module 1630 may provide one or more informational elements to be presented in a dynamically contextually relevant display 1647. In one aspect, the displaying may be distinguished based on use of different fonts, different font sizes, different font colors, different graphical icons, flashing text, flashing graphics, tactile feedback (e.g., device vibration), positioning the contextually relevant informational element in a comparatively more prominent location of the user interface, etc., or any combination thereof.

Figure 17:
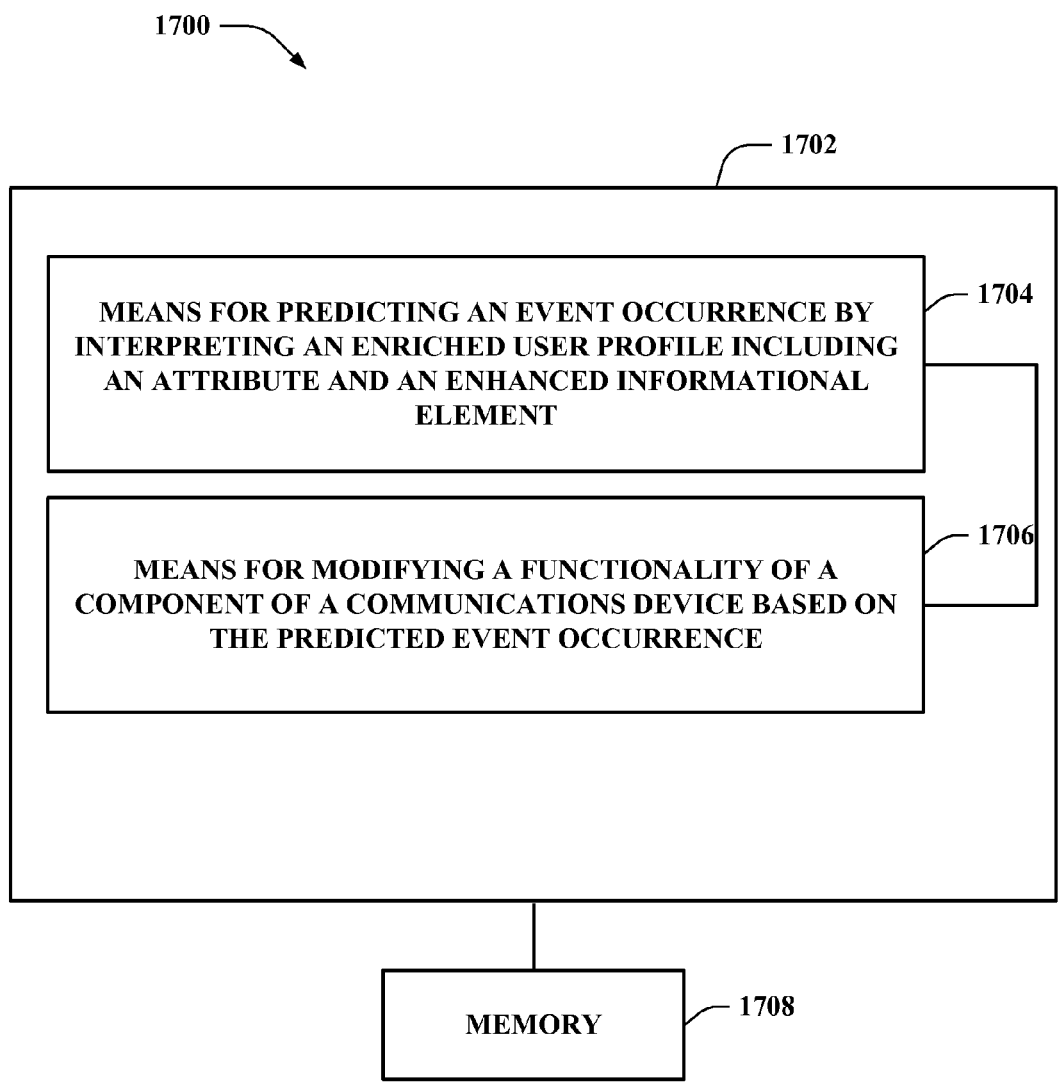
FIG. 17 depicts another block diagram of an exemplary communication system for using an enriched user profile, according to an aspect.

FIG. 17 depicts another block diagram of an exemplary communication system 1700 operable to use an enriched user profile, according to an aspect. For example, system 1700 can reside at least partially within a communications device (e.g., communications device 1600). It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction.

For instance, logical grouping 1702 can include an electrical component that may provide means for predicting an event occurrence by interpreting an enriched user profile including an attribute and an enhanced informational element 1704. In one aspect, the user specific informational element may be a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, etc., or any combination thereof. In an aspect, the electrical component 1704 may further be configured for detecting a modification to the attribute within a first threshold period of time, determining a first pattern associated with the detected modification to the attribute, searching the enriched user profile for a second pattern associated with a second attribute within a matching threshold of the first pattern, determining an event associated with the second attribute, and using the event associated with the second attribute as the predicted event occurrence. In another aspect, the electrical component 1704 may further be configured for predicting availability of a second bearer at a first time wherein the second bearer is different than a current bearer. In another aspect, the electrical component 1704 may further be configured for predicting availability of a charging source, active usage of the communications device, etc. In another aspect, the electrical component 1704 may further be configured for predicting a first time associated with the event occurrence.

Moreover, logical grouping 1702 can include an electrical component that may provide means for modifying a functionality of a component of a communications device based on the predicted event occurrence 1706. In another aspect, the electrical component 1706 may further be configured for delaying a download of a content item until a predicted time. In another aspect, the electrical component 1706 may further be configured for pre-fetching a content item prior to a predicted time. In another aspect, the electrical component 1706 may further be configured for modifying timing associated with activation of a sleep mode, screen dimming, a screen shutoff, etc. In another aspect, the electrical component 1706 may further be configured for modifying the functionality of an application operating in a background mode. In another aspect, the logical grouping 1702 includes an electrical component that may provide means for detecting initiation of the component. In another aspect, the electrical component 1706 may further be configured for determining a contextually relevant informational element associated with the detected component. In such an aspect, the electrical component 1706 may further be configured for providing the determined contextually relevant informational element to the detected component as a suggested entry. In such an aspect, the electrical component 1706 may further be configured for providing the suggested entry in a format allowing the detected component to present the suggested entry as a list, a grid, a queue, a stack, a carousel, an overlay, etc. In one aspect, the electrical component 1706 may further be configured for providing the contextually relevant informational element to the component at a predicted time. In one aspect, the electrical component 1706 may further be configured for providing the determined contextually relevant informational element to the detected component prior to an input by a user. In such an aspect, the electrical component 1706 may further be configured for providing the contextually relevant informational element in a format allowing the component to present the contextually relevant informational element as a list, a grid, a queue, a stack, a carousel, an overlay, etc. In one aspect, the electrical component 1706 may further be configured for presenting the contextually relevant informational element on a user interface. In such an aspect, the electrical component 1706 may further be configured for presenting the contextually relevant informational element in a dynamic suggestive manner. Further, in such an aspect, the electrical component 1706 may further be configured for determining a relevance to the user of the contextually relevant informational element, and presenting the contextually relevant informational element based on the determined relevance to the user. Still further, in such an aspect, the electrical component 1706 may further be configured for using a different font, using a different font size, using a different font color, using a different graphical icon, using another form of user interface indication including flashing text, graphics, etc., or any combination thereof, using of a vibration motor for tactile feedback, positioning the contextually relevant informational element in a comparatively more prominent location of the user interface, etc. Additionally, in such an aspect, the electrical component 1706 may further be configured for positioning the contextually relevant informational element on the user interface in a first portion of the user interface that is different than a second portion of the user interface used to display a non-contextually relevant informational element. In another aspect, where the logical grouping 1702 includes an electrical component that may provide means for detecting initiation of the component, the electrical component 1706 may further be configured for detecting powering up of the communications device, waking up the communications device from a sleep state, unlocking a lock screen, etc.

Additionally, system 1700 can include a memory 1708 that retains instructions for executing functions associated with the electrical components 1704 and 1706, and stores data used or obtained by the electrical components 1704 and 1706, etc. While shown as being external to memory 1708, it is to be understood that one or more of the electrical components 1704 and 1706 may exist within memory 1708. In one example, electrical components 1704 and 1706 can include at least one processor, or each electrical component 1704 and 1706 can be a corresponding module of at least one processor. Moreover, in an additional or alternative example, electrical components 1704 and 1706 may be a computer program product including a computer readable medium, where each electrical component 1704 and 1706 may be corresponding code.

Figures 18A, 18B:
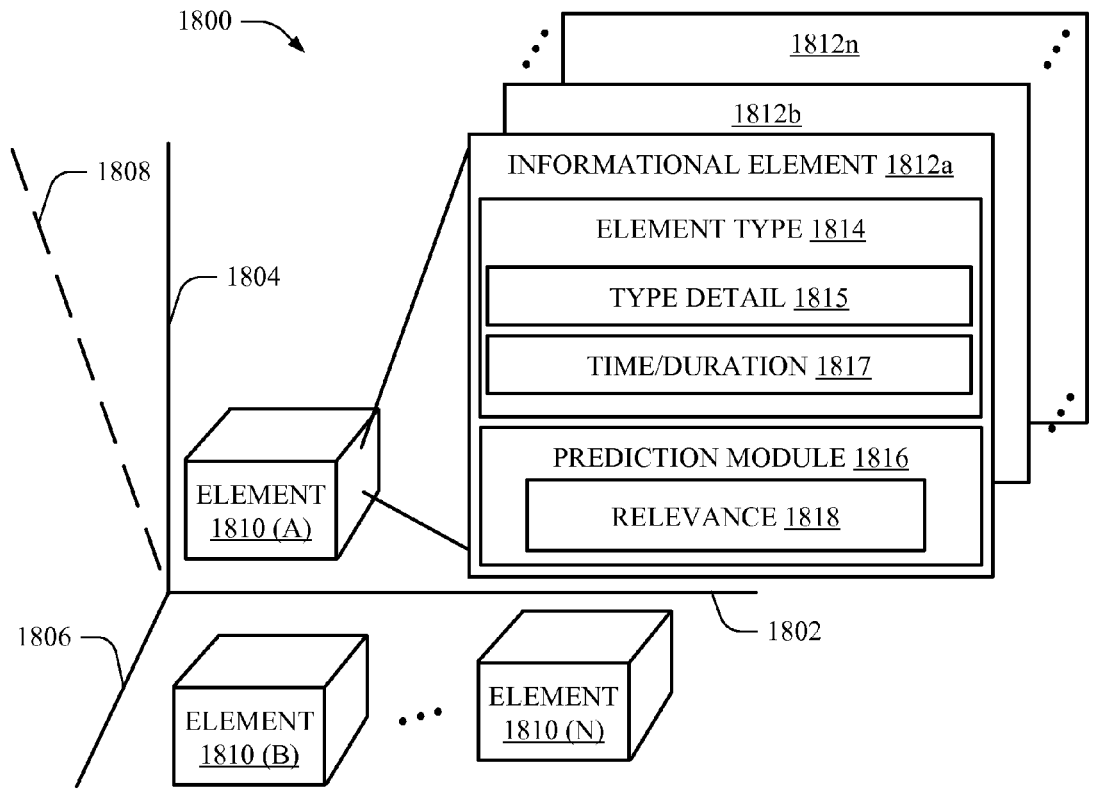
FIG. 18A depicts a block diagram of an example organizational matrix for use with an enriched user profile, according to an aspect.
FIG. 18B depicts a block diagram of an example structure in an organizational matrix in which a repetitious structure determination is performed, according to an aspect.

FIG. 18A illustrates a data organizational space 1800 in which an organizational matrix may be graphically depicted, according to an aspect. An organizational matrix defined through three or more informational elements is depicted in organizational space 1800. Although organizational space 1800 is depicted to include an organizational matrix with three informational elements representing axes 1802, 1804, 1806, notably, the organizational space 1800 may not be limited to a three dimensions organizational matrix. According to one or more aspects, organizational space 1800 may support organizational matrices with any number of informational elements and the number of informational elements used to define an organizational matrix may vary dynamically. For example, a fourth informational element used to define an organizational matrix may be represented by a fourth axis 1808. One of ordinary skill in the art would understand that the three axes are presented for clarity of explanation and are not intended to limit the scope of the claimed subject matter. Additionally, in one aspect, informational elements used to define one or more axes (e.g., 1802, 1804, 1806) may change dynamically.

In one aspect, an organizational matrix may be populated with one or more elements (e.g., 1810(A), 1810(B), . . . 1810(N)). Element 1810 may be an attribute and may be incorporated into an enriched user profile. Each element 1810 included in the enriched user profile may include one or more informational elements (e.g., 1812a, 1812b, . . . 1812n). For example, an informational element 1812 may define an event at a specific time of day, on a specific day, etc. In such an example, the informational element 1812 may include an element type 1814 which in turn may include an element type detail 1815 and an element time/duration 1817. In one aspect, generally, element type 1814 may include event information, time of day, day of week, etc.

In one aspect, through organizing the elements 1810 using the informational element axes (1802, 1804, 1806), into an organizational matrix, a repetitious structure may be discerned. In one aspect, where multiple elements 1810(A), 1810(B), . . . 1810(N) in the organizational matrix share aspects of one or more informational elements (1812a, 1812b, 1812n), then these elements may be interpreted to be repetitious occurrences of a single or similar event. For example, if events occur multiple times within a certain time of day, day of week, location, etc., then these events may be related. In another example, if multiple trips are taken to a specific location (e.g., restaurant, specific address, etc.), then these events may be related. Further, aspects of the repetitious nature of the element may be useful in determining relevance 1818 (e.g., intensity) of the informational element 1812 to the user. Such relevance 1818 may be used to supplement an enriched user profile so as to provide additional information to enable the system to determine contextually important information for a user. In another aspect, the repetitious structure of the organizational matrix and relevance 1818 may be used by a prediction module 1816 to predict occurrence of a future event of interest to the user.

In one aspect, through organizing the one or more elements 1810(A), 1810(B), . . . 1810(N) in an organizational matrix, querying of the elements may be performed in a contextually relevant manner. Multiple informational elements may be queried together to detect additional contextual information. For example, assuming each element is defined by three informational elements where each informational element defines an axis of a cube, the cube may be populated with multiple elements and queried along any plane intersecting the cube. In such an example, the query criteria may define a plane with information associated with a specific event, a specific period of the day, etc. Such a query may assist in determining that the event occurs more often during a specific period of the day, and additional relevance 1818 may be added to the event during that period of the day in the enriched user profile.

Such query data, and/or repetitious structure determined from one or more elements 1810(A), 1810(B), . . . 1810(N) in an organizational matrix within the organizational space 1800 may provide prediction module 1816 with information to determine potential occurrence of one or more future events, items, elements, etc.

FIG. 18B depicts a block diagram of an example structure in an organizational matrix in which a repetitious structure determination may be performed, according to an aspect. The example structure depicted in FIG. 18B can be an element 1810 (e.g., element 1810A) in a matrix form. In one aspect, element 1810A can include multiple informational elements 1812 represented as columns. In the depicted aspect, each informational element 1812 is associated with a different day of the week. Further, each informational element 1812 may include multiple entries. Like entries can be lined up as rows in FIG. 18B. For example, the rows in FIG. 18B may represent a morning time interval, a first application usage, a first location, a second location, a second application usage, an afternoon time interval, the first application usage (during the afternoon), the first location (during the afternoon), etc. Further, a relevance value may be included with each entry (e.g., a measure of importance/occurrence for each entry where, for example "0" is the least important and "9" is the most important). In the depicted aspect, the second row 1820 may indicate an application usage in the morning on each day of the week. Further, the eighth row 1822 may indicate usage of the same application in the afternoon for each day of the week.

In an example aspect, various repetitious structures may be determined within the depicted element 1810A. One such repetitious structure may be determined from the entries included in the second row 1820. As the second row 1820 of the depicted element 1810A includes entries on a portion of informational elements above a threshold value (e.g., 75% of the entries), the entries may be determined to indicate a repetitious structure. A similar repetitious structure may be determined from the entries included in the eighth row 1822. Further, the entry values in the eighth row 1822 generally include higher values than the entry values in the second row 1820, and as such the repetitious structure determined from the eighth row entries 1822 may also be determined to be comparatively more relevant to the user. In other words, a user may be more likely to extensively use a first application in the afternoon rather than the morning. In another example, the entries included in the informational elements making up the sixth and seventh columns 1824 may indicate an increased activity on specific days of the week (e.g., the weekend). These weekend column values may be compared with column values in other elements (e.g., 1810B, 1810N, etc.) to determine repetitious usage/activity patterns (e.g., the user uses the communications device more often on weekends, etc.).

As such, elements 1810, informational elements 1812, entries such as element type 1814, type detail 1815, time/duration 1817, may be used to determine repetitious patterns with an organizational space 1800.

Figure 19:
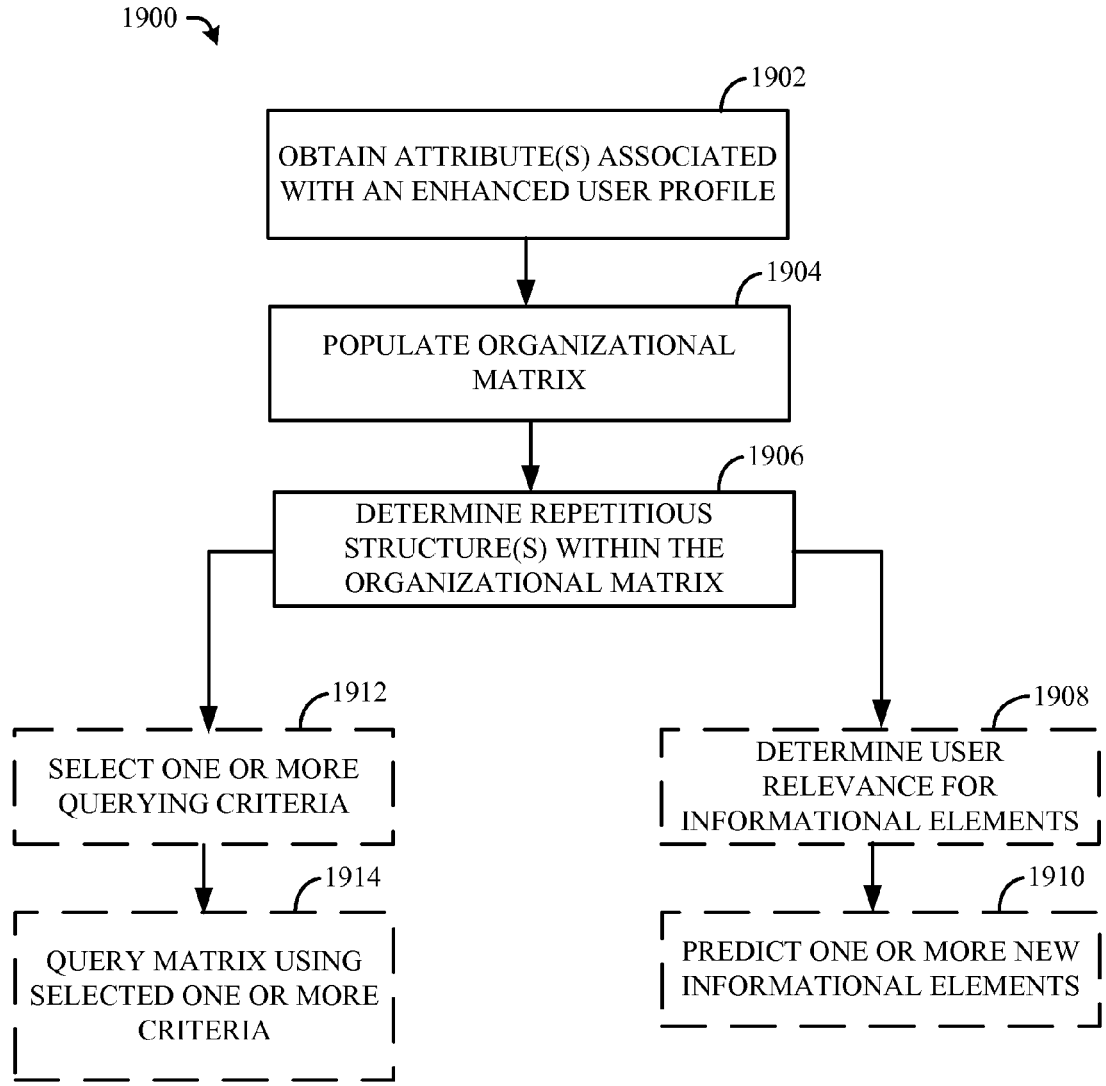
FIG. 19 depicts a flowchart describing an example system for generating and using an organizational matrix to support use of an enriched user profile according to an aspect.

FIG. 19 illustrates an example flowchart process 1900 performed by a communications device to organize at least a portion of an enriched user profile into an organizational matrix.

At block 1902, a communications device may obtain one or more attributes associated with an enriched user profile. Each attribute may be defined by three or more informational elements. In one aspect, the informational elements may be user specific informational elements, enhanced informational elements, etc., or any combination thereof. Further, at least one of the three or more informational elements includes a contextual sub-element. In one aspect, such contextual sub-elements may include the contextual sub-element that may be a location associated with a user, a time of day, a day of the week, an activity associated with the user, a level of user interaction with the communications device, a user's recent interaction with the communications device, an available resource associated with the communications device, a sensor output associated with the communications device, a battery life value associated with the communications device, news relevant to the user, an item scheduled in a calendar application, a tasks application, a notes application, a contacts application, etc., weather information, traffic information, a proximity value of the communications device to another device, a proximity value of the communications device to another user, server derived content, etc., or any combination thereof. In an aspect, the three or more informational elements may be obtained from at least one component associated with the communications device. In such an aspect, the component may be an application associated with the communications device, a sensor associated with the communications device, a hardware component associated with the communications device, etc., or any combination thereof. Further, in such an aspect, the attribute may include information associated with an event start time, an event time duration, or an event end time, etc., or any combination thereof.

At block 1904, the communications device may populate an organizational matrix based on the obtained one or more attributes. In one aspect, the attributes may include a time stamp and may be removed from the organizational matrix after a defined time (e.g., a day, a week, etc.)

At block 1908, the communications device may determine one or more repetitious structures (e.g., patterns) within the organizational matrix. For example, the repetitious structure may be time based, location based, event based, etc., or any combination thereof.

In operation, the organizational matrix may be used to predict one or more additional attributes. In an optional aspect, at block 1908, the organizational matrix may be analyzed to determine relevance for at least a portion of the informational elements. In an aspect, relevance may be used to indicate an intensity of the user's interest in an element, characteristic of an element, etc. For example, if the organizational matrix indicates that a user visits a certain restaurant at lunch every Wednesday, then a high relevancy value may be applied for the location, time and day.

At optional block 1910, due to the repetitious nature of the organizational matrix, the communications device may predict future new one or more informational elements, based at least in part on the obtained attributes and/or determined relevancy values.

In another operational aspect, the organizational matrix may be used to improve usefulness of obtained content elements. In an optional aspect, at block 1912, the UE may select one or more informational elements to query the organizational matrix for other content elements that may include the same or similar informational elements. In another aspect, multiple informational elements that may be organized into a pattern may be used to search for the same or similar patterns within the organizational matrix. In still another aspect, where the organizational matrix may be represented as a cube, informational elements associated with two of the three cube axes may be selected to perform a query within a planar slice of the cube.

At optional block 1914, the organizational matrix may be queried using the one or more selected criteria. In such an optional aspect, the communications device may further be configured for determining a level of user privacy, and selecting the query criteria based on the level of user privacy.

Figure 20:
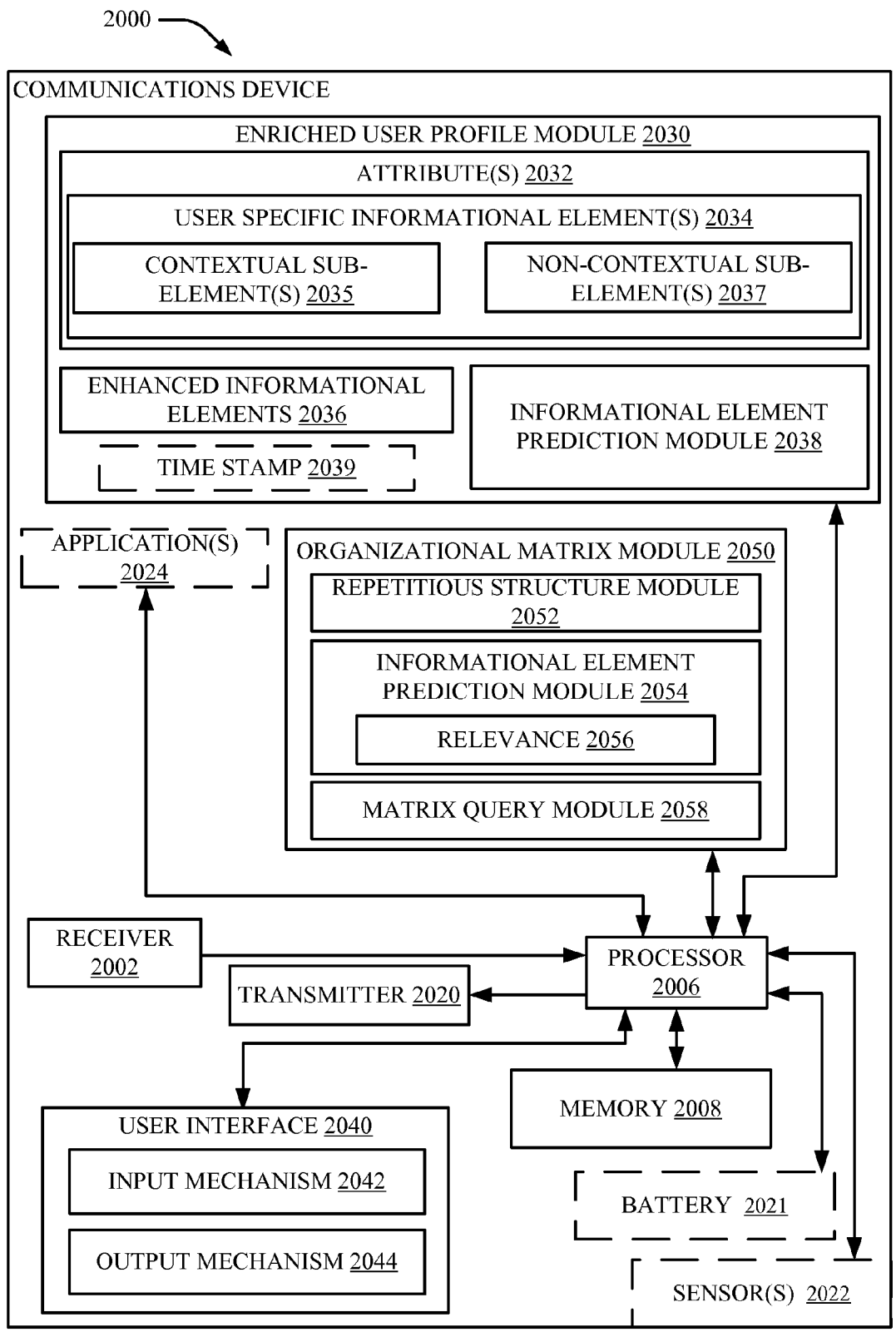
FIG. 20 depicts a block diagram of an example communications device for providing for an enhanced user experience through use of an enriched user profile according to an aspect.

FIG. 20 depicts a block diagram of an example communications device 2000 for providing for an enhanced user experience through use of an enriched user profile according to an aspect. Communications device 2000 comprises receiver 2002 that receives one or more signals from, for instance, one or more receive antennas (not shown), performs typical actions on (e.g., filters, amplifies, downconverts, etc.) the received signal, and digitizes the conditioned signal to obtain samples. Receiver 2002 can further comprise an oscillator that can provide a carrier frequency for demodulation of the received signal and a demodulator that can demodulate received symbols and provide them to processor 2006 for channel estimation. In one aspect, communications device 2000 may further comprise one or more secondary receivers and may receive additional channels of information.

Processor 2006 can be a processor dedicated to analyzing information received by receiver 2002 and/or generating information for transmission by one or more transmitters 2020 (for ease of illustration, one transmitter is shown), a processor that controls one or more components of communications device 2000, and/or a processor that both analyzes information received by receiver 2002, generates information for transmission by transmitter 2020 for transmission on one or more transmitting antennas (not shown), and controls one or more components of communications device 2000.

In one aspect, processor 2006, enriched user profile module 2030, and/or organizational matrix module 2050 may provide means for obtaining an attribute associated with an enriched user profile including three or more informational elements, wherein at least one of the three or more informational elements includes a contextual sub-element, means for populating an organizational matrix using the three or more informational elements, and means for determining a repetitious structure based at least in part on analysis of the populated organizational matrix.

Communications device 2000 can additionally comprise memory 2008 that is operatively coupled to processor 2006 and that can store data to be transmitted, received data, information related to available channels, data associated with analyzed signal and/or interference strength, information related to an assigned channel, power, rate, or the like, and any other suitable information for estimating a channel and communicating via the channel. Memory 2008 can additionally store protocols and/or algorithms associated with estimating and/or utilizing a channel (e.g., performance based, capacity based, etc.). In one aspect, memory 2008 may include a UICC which may include various modules such as but not limited to, a subscriber information module (SIM), a CDMA Subscriber Identity Module (CSIM), etc.

It will be appreciated that the data store (e.g., memory 2008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Memory 2008 of the subject systems and methods is intended to comprise, without being limited to, these and any other suitable types of memory.

Communications device 2000 may include enriched user profile module 2030, may optionally include one or more components such as battery 2021 and one or more sensors 2022, and one or more applications 2024. In such an optional aspect, Application 2024 may assist communications device to perform specific tasks. Enriched user profile module 2030 may support generating/maintaining/modifying and/or updating an enriched user profile. Enriched user profile module 2030 may include one or more attributes 2032 associated with a user. Each attribute may include one or more user specific informational elements 2034 and each user specific informational element may include a contextual sub-element 2035 and/or a non-contextual sub-element 2037. In one aspect, user specific informational elements 2034 may be supplemented with an enhanced informational element 2036 obtained from a profile server. Further, enriched user profile module 2030 may include informational element prediction module 2038 that may assist enriched user profile module 2030 in predicting occurrence of one or more events. In an optional aspect, enriched user profile module 2030 may associate a time stamp 2039 with some of the attributes. In such an optional aspect, the attributes may be organized using the time stamp 2039 based on their respective freshness/staleness.

Organizational matrix module 2050 may be operable to assist communications device 2000 in providing structure to the one or more attributes 2032 associated with the enriched user profile. In one aspect, organizational matrix module 2050 may include repetitious structure module 2052, informational element prediction module 2054 and matrix query module 2058. Repetitious structure module 2052 may be operable to analyze an organizational matrix populated with one or more attributes 2032 to determine patterns and/or multiple similar occurrences. Informational element prediction module 2054 may be operable to analyze one or more attributes 2032 associated with the enriched user profile to determine relevance 2026 for a portion of the informational elements. Matrix query module 2058 may be operable to select one or more informational elements to query the organizational matrix for other content elements that may include the same or similar informational elements. In another aspect, multiple informational elements that may be organized into a pattern may be used to search for the same or similar patterns within the organizational matrix. In still another aspect, where the organizational matrix may be represented as a cube, informational elements associated with two of the three cube axes may be selected to perform a query within a planar slice of the cube. Once a query criterion or criteria has been selected, matrix query module 2058 may query the organizational matrix. In one or more aspects, operation of organizational matrix module 2050 may be depicted as provided in the flowcharts of FIG. 19.

Additionally, communications device 2000 may include user interface 2040. User interface 2040 may include input mechanisms 2042 for generating inputs into communications device 2000, and output mechanism 2044 for generating information for consumption by the user of communications device 2000. For example, input mechanism 2042 may include a mechanism such as a key or keyboard, a mouse, a touch-screen display, a microphone, etc. Further, for example, output mechanism 2044 may include a display, an audio speaker, a haptic feedback mechanism, a Personal Area Network (PAN) transceiver etc. In one aspect, output mechanism 2044 may include a display operable to present content that is in image or video format or an audio speaker to present content that is in an audio format.

Figure 21:
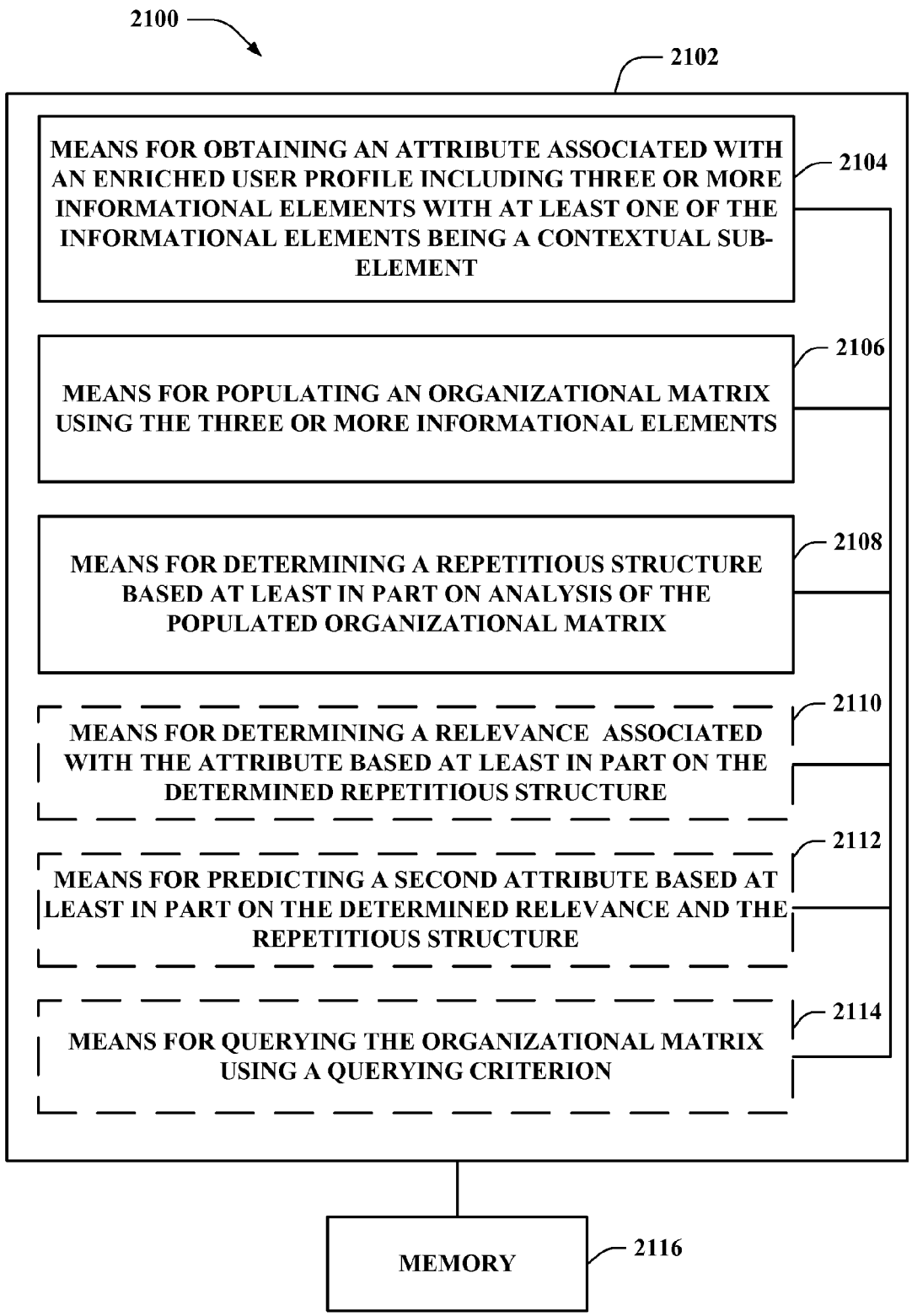
FIG. 21 depicts another block diagram of an exemplary communication system for using an enriched user profile, according to an aspect.

FIG. 21 depicts another block diagram of an exemplary communication system 2100 operable to use an enriched user profile, according to an aspect. For example, system 2100 can reside at least partially within a communications device (e.g., communications device 2000). It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction.

For instance, logical grouping 2102 can include an electrical component that may provide means for obtaining an attribute associated with an enriched user profile including three or more informational elements 2104. In one aspect, at least one of the three or more informational elements may include a contextual sub-element. In an aspect, the electrical component 2104 may further be configured for obtaining the three or more informational elements from at least one component associated with a communications device. In such an aspect, the component may be an application associated with the communications device, a sensor associated with the communications device, a hardware component associated with the communications device, etc., or any combination thereof. Further, in such an aspect, the attribute may include information associated with an event start time, an event time duration, or an event end time, etc., or any combination thereof. In another aspect, the electrical component 2104 may further be configured for obtaining a second instance of an informational element for the informational element, and updating the informational element with the second instance of the informational element. In another aspect, the electrical component 2104 may further be configured for obtaining a second attribute. In one aspect, two of the three or more informational elements may be time based. Further, one of the two time-based informational elements may be a period of a day, days of a week, months of a year, etc. In one aspect, at least one of the three or more informational elements used to populate the organizational matrix may be dynamically changed. In one aspect, the contextual sub-element may be a location associated with a user, a time of day, a day of the week, an activity associated with the user, a level of user interaction with the communications device, a user's recent interaction with the communications device, an available resource associated with the communications device, a sensor output associated with the communications device, a battery life value associated with the communications device, news relevant to the user, an item scheduled in a calendar application, a tasks application, a notes application, a contacts application, etc., weather information, traffic information, a proximity value of the communications device to another device, a proximity value of the communications device to another user, or server derived content, etc., or any combination thereof. In one aspect, the attribute may include a non-contextual sub-element that may include a user's gender, the user's age, another device associated with the user, the user's media interest, the user's financial information, the user's game interest, an association with a second user, or the user's profession, etc., or any combination thereof.

Further, logical grouping 2102 can include an electrical component that may provide means for populating an organizational matrix using the three or more informational elements 2106. In another aspect, the electrical component 2106 may further be configured for time stamping the obtained attribute, and removing the attribute from the organizational matrix after a threshold period of time has elapsed based on the time stamp.

Further, logical grouping 2102 can include an electrical component that may provide means for determining a repetitious structure based at least in part on analysis of the populated organizational matrix 2108.

In an optional aspect, logical grouping 2102 can include an electrical component that may provide means for determining a relevance value associated with the attribute based at least in part on the determined repetitious structure 2110.

Further, in such an optional aspect, logical grouping 2102 can include an electrical component that may provide means for predicting a second attribute based at least in part on the determined relevance and the repetitious structure 2112. In such an optional aspect, the electrical component 2112 may further be configured for detecting a modification to the attribute within a first threshold period of time, determining a first pattern associated with the detected modification to the attribute based on the repetitious structure and searching the organizational matrix for a second pattern associated with the second attribute within a matching threshold of the first pattern. In such an optional aspect, the electrical component 2112 may further be configured for determining an event associated with the second attribute, and using the event associated with the second attribute to predict occurrence of the event.

In another optional aspect, logical grouping 2102 can include an electrical component that may provide means for querying the organizational matrix using a querying criterion 2114. In such an optional aspect, the electrical component 2114 may further be configured for selecting at least one of the three or more informational elements as the querying criterion. In such an optional aspect, the electrical component 2114 may further be configured for determining a level of user privacy, and selecting the at least one of the three or more informational elements based on the level of user privacy. In such an optional aspect, the organizational matrix may be represented as a cube, and the querying criteria may represent a plane of the cube.

Additionally, system 2100 can include a memory 2116 that retains instructions for executing functions associated with the electrical components 2104, 2106, 2108, and optional electrical components 2110, 2112 and 2114, and stores data used or obtained by the electrical components 2104, 2106, 2108, and optional electrical components 2110, 2112 and 2114, etc. While shown as being external to memory 2116, it is to be understood that one or more of the electrical components 2104, 2106, 2108, and optional electrical components 2110, 2112 and 2114 may exist within memory 2116. In one example, electrical components 2104, 2106, 2108, and optional electrical components 2110, 2112 and 2114 can include at least one processor, or each electrical component 2104, 2106, 2108, and optional electrical components 2110, 2112 and 2114 can be a corresponding module of at least one processor. Moreover, in an additional or alternative example, electrical components 2104, 2106, 2108, and optional electrical components 2110, 2112 and 2114 may be a computer program product including a computer readable medium, where each electrical component 2104, 2106, 2108, and optional electrical components 2110, 2112 and 2114 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA and other systems. The terms "system" and "network" are often used interchangeably. A CDMA system may implement a radio technology such as UTRA, CDMA2000, etc. UTRA includes Wideband-CDMA (W-CDMA) and other variants of CDMA.

Further, CDMA2000 covers IS-2000, IS-95 and IS-856 standards. A TDMA system may implement a radio technology such as GSM. An OFDMA system may implement a radio technology such as E-UTRA, Ultra Mobile Broadband (UMB), IEEE 802.11 (Wi-Fi), IEEE 802.16 (WiMAX), IEEE 802.20, Flash-OFDMT™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method of communications, comprising:
 determining an attribute associated with a user of a communications device based at least in part on data captured from a component operable on the communications device, wherein the attribute includes one or more user specific informational elements that comprise user specific data associated with the user of the communications device;

generating a profile synopsis that abstracts the determined attribute associated with the user to remove at least a portion of the one or more user specific informational elements that include the user specific data associated with the user of the communications device, wherein the removed portion of the one or more user specific informational elements includes at least location information;

transmitting the profile synopsis to a server, wherein the server adds the profile synopsis to an aggregate data model derived from profile synopses from a plurality of devices;

receiving an enhanced informational element from the server in response to the transmitted profile synopsis, wherein the enhanced informational element comprises information in the aggregate data model determined to be lacking in the transmitted profile synopsis; and generating, at the communications device, an enriched user profile that augments the determined attribute associated with the user of the communications device with at least a portion of the received enhanced informational element.

2. The method of claim 1, wherein the obtaining further comprises:
   detecting a component type for the component;
   determining the attribute associated with the user of the communications device based on the component type; and
   extracting the data captured from the component operable on the communications device based on the component type.

3. The method of claim 1, wherein the component is at least one of an application associated with the communications device, a sensor associated with the communications device, a hardware component associated with the communications device, or any combination thereof.

4. The method of claim 1, wherein the user specific informational element is at least one of a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, or any combination thereof.

5. The method of claim 1, wherein the transmitting and receiving occur once during a group profile aggregation period.

6. The method of claim 1, wherein the user specific informational element comprises at least one of a contextual sub-element, a non-contextual sub-element, or any combination thereof.

7. The method of claim 6, wherein the contextual sub-element is at least one of a location associated with a user, a time of day, a day of a week, an activity associated with the user, a level of user interaction with the communications device, the user's recent interaction with the communications device, an available resource associated with the communications device, a sensor output associated with the communications device, a battery life value associated with the communications device, news relevant to the user, an item scheduled in a calendar application, weather information, traffic information, a proximity value of the communications device to other devices, a proximity value of the communications device to other users, server derived content, or any combination thereof.

8. The method of claim 7, wherein generating the profile synopsis further comprises removing at least a portion of the contextual sub-element of the user specific informational element.

9. The method of claim 8, wherein removing at least the portion of the contextual sub-element further comprises removing at least one of the location information or information that individually identifies the user of the communications device from the contextual sub-element.

10. The method of claim 6, wherein the non-contextual sub-element is at least one of a user's gender, the user's age, another device associated with the user, the user's media interest, the user's financial information, the user's game interest, an association with a second user, the user's profession, or any combination thereof.

11. The method of claim 1, wherein the server does not store the profile synopsis and disassociates a link between the profile synopsis and the user of communications device once the transmitted profile synopsis is added to the aggregate data model.

12. The method of claim 1, wherein the profile synopsis is transmitted to the server based on one or more of a prompt received from the server or one or more resources available to the communications device.

13. The method of claim 1, further comprising:
   receiving a prompt to one or more of retrieve the enhanced informational element from the server or contribute data to be added to the aggregate group profile data model stored at the server, wherein the profile synopsis is generated in response to the prompt.

14. The method of claim 1, wherein the information in the enhanced informational element received from the server is determined to be lacking in the transmitted profile synopsis based on the information in the enhanced informational element being one or more of missing, outdated, or inaccurate in the transmitted profile synopsis.

15. The method of claim 1, further comprising:
   transmitting a profile server query to the server, the transmitted profile server query further modifies at least a portion of the one or more user specific informational elements to disassociate the determined attribute from the user;
   receiving metadata that includes contextual information to supplement the enriched user profile from the server in response to the transmitted profile server query; and
   augmenting the enriched user profile with the received metadata, wherein augmenting the enriched user profile comprises one or more of adding the received metadata to information in the determined attribute associated with the user or replacing information in the determined attribute associated with the user with the received metadata.

16. The method of claim 1, further comprising:
   generating a proxy user identifier to identify the communications device;
   transmitting the proxy user identifier to a second server to allow the second server access to at least a portion of the profile synopsis; and
   receiving personalized content determined at the second server based on at least the portion of the profile synopsis to which the second server is allowed access.

17. An apparatus for communications, comprising:
   means for determining an attribute associated with a user of a communications device based at least in part on data captured from a component operable on the communications device, wherein the attribute includes one or more user specific informational elements that comprise user specific data associated with the user of the communications device;

means for generating a profile synopsis that abstracts the determined attribute associated with the user to remove at least a portion of the one or more user specific informational elements that include the user specific data associated with the user of the communications device, wherein the removed portion of the one or more user specific informational elements includes at least location information;

means for transmitting the profile synopsis to a server configured to add the profile synopsis to an aggregate data model derived from profile synopses from a plurality of devices;

means for receiving an enhanced informational element from the server in response to the transmitted profile synopsis, wherein the enhanced informational element comprises information in the aggregate data model determined to be lacking in the transmitted profile synopsis; and means for generating, at the communications device, an enriched user profile that augments the determined attribute associated with the user of the communications device with at least a portion of the received enhanced informational element.

18. The apparatus of claim 17, wherein the means for determining further comprises:
means for detecting a component type for the component;
means for determining the attribute associated with the user of the communications device based on the component type; and
means for extracting the data captured from the component operable on the communications device based on the component type.

19. The apparatus of claim 17, wherein the means for generating the profile synopsis further comprises means for removing at least a portion of a contextual sub-element of the user specific informational element.

20. The apparatus of claim 19, wherein the means for removing at least the portion of the contextual sub-element further comprises means for removing at least one of the location information or information that individually identifies the user of the communications device from the contextual sub-element.

21. An apparatus for communications, comprising:
a processor configured to determine an attribute that includes one or more user specific informational elements associated with a user of a communications device based at least in part on data captured from a component operable on the communications device and to generate a profile synopsis that abstracts the determined attribute associated with the user to remove at least a portion of the one or more user specific informational elements that include user specific data associated with the user from the attribute, wherein the removed portion of the one or more user specific informational elements includes at least location information;
a transmitter configured to transmit the profile synopsis to a server configured to add the profile synopsis to an aggregate data model derived from profile synopses from a plurality of devices; and
a receiver configured to receive an enhanced informational element that comprises information in the aggregate data model determined to be lacking in the transmitted profile synopsis from the server in response to the transmitted profile synopsis, wherein the processor is further configured to augment the determined attribute associated with the user of the communications device with at least a portion of the received enhanced informational element to generate, at the communications device, an enriched user profile that includes at least the augmented attribute.

22. The apparatus of claim 21, wherein the processor is further configured to:
detect a component type for the component;
determine the attribute associated with the user of the communications device based on the component type; and
extract the data captured from the component operable on the communications device based on the component type.

23. The apparatus of claim 21, wherein the component is at least one of an application associated with the communications device, a sensor associated with the communications device, a hardware component associated with the communications device, or any combination thereof.

24. The apparatus of claim 21, wherein the user specific informational element is at least one of a user interest, place information, location information, communications device sensor derived data, communications device hardware derived data, a user characteristic, user demographics information, a browser history, application usage history, a call history, communications device background activity, traffic utilization data, a communications device charge level, a communications device charge state, user input, or any combination thereof.

25. The apparatus of claim 21, wherein the processor is further configured to transmit the profile synopsis and receive the enhanced informational element once during a group profile aggregation period.

26. The apparatus of claim 21, wherein the user specific informational element comprises at least one of a contextual sub-element, a non-contextual sub-element, or any combination thereof.

27. The apparatus of claim 26, wherein the contextual sub-element is at least one of a location associated with a user, a time of day, a day of a week, an activity associated with the user, a level of user interaction with the communications device, the user's recent interaction with the communications device, an available resource associated with the communications device, a sensor output associated with the communications device, a battery life value associated with the communications device, news relevant to the user, an item scheduled in a calendar application, weather information, traffic information, a proximity value of the communications device to other devices, a proximity value of the communications device to other users, server derived content, or any combination thereof.

28. The apparatus of claim 27, wherein the processor is further configured to remove at least a portion of the contextual sub-element of the user specific informational element.

29. The apparatus of claim 28, wherein the processor is further configured to remove at least one of the location information or information that individually identifies the user of the communications device information from the contextual sub-element.

30. The apparatus of claim 26, wherein the non-contextual sub-element is at least one of a user's gender, the user's age, another device associated with the user, the user's media interest, the user's financial information, the user's game interest, an association with a second user, the user's profession, or any combination thereof.

31. A non-transitory computer-readable medium, comprising one or more instructions for causing a communications device to:
- determine an attribute associated with a user of a communications device based at least in part on data captured from a component operable on the communications device, wherein the attribute includes one or more user specific informational elements that comprise user specific data associated with the user of the communications device;
- generate a profile synopsis that abstracts the determined attribute associated with the user to remove at least a portion of the one or more user specific informational elements that include the user specific data associated with the user of the communications device, wherein the removed portion of the one or more user specific informational elements includes at least location information;
- transmit the profile synopsis to a server configured to add the profile synopsis to an aggregate data model derived from profile synopses from a plurality of devices;
- receive, from the server, an enhanced informational element that comprises information in the aggregate data model determined to be lacking in the transmitted profile synopsis in response to the transmitted profile synopsis; and
- generate, at the communications device, an enriched user profile that augments the determined attribute associated with the user of the communications device with at least a portion of the received enhanced informational element.

32. The non-transitory computer-readable medium of claim 31, wherein the one or more instructions further cause the communications device to:
- detect a component type for the component;
- determine the attribute associated with the user of the communications device based on the component type; and
- extract the data captured from the component operable on the communications device based on the component type.

33. The non-transitory computer-readable medium of claim 31, wherein the one or more instructions further cause the communications device to remove at least a portion of a contextual sub-element of the user specific informational element.

34. The non-transitory computer-readable medium of claim 33, wherein the one or more instructions further cause the communications device to remove at least one of the location information or information that individually identifies the user of the communications device from the contextual sub-element.

* * * * *